(12) United States Patent
Uzawa et al.

(10) Patent No.: US 7,564,619 B2
(45) Date of Patent: Jul. 21, 2009

(54) STEREOMICROSCOPE

(75) Inventors: Tsutomu Uzawa, Hidaka (JP); Yasushi Namii, Hachioji (JP)

(73) Assignee: Olympus Medical Systems Corp., Tokyo (JP)

( * ) Notice: Subject to any disclaimer, the term of this patent is extended or adjusted under 35 U.S.C. 154(b) by 0 days.

(21) Appl. No.: 12/004,665

(22) Filed: Dec. 20, 2007

(65) Prior Publication Data
US 2008/0174861 A1   Jul. 24, 2008

(30) Foreign Application Priority Data
Jan. 12, 2007   (JP)   ............................. 2007-004914

(51) Int. Cl.
  *G02B 21/22*   (2006.01)
  *G02B 21/00*   (2006.01)
(52) U.S. Cl. ........................ 359/377; 359/368; 359/380; 359/656
(58) Field of Classification Search ......... 359/368–390, 359/656–661
See application file for complete search history.

(56) References Cited

U.S. PATENT DOCUMENTS 4,640,586 A * 2/1987 Iba et al. ..................... 359/659
6,471,642 B1 * 10/2002 Igarashi ....................... 600/166
7,085,045 B2 * 8/2006 Hanzawa et al. ............ 359/376

FOREIGN PATENT DOCUMENTS

JP   2006-158452   6/2006
JP   2006-194976   7/2006

* cited by examiner

*Primary Examiner*—Thong Nguyen
(74) *Attorney, Agent, or Firm*—Kenyon & Kenyon LLP

(57) ABSTRACT

A stereomicroscope has, in order form the object side, a single objective lens system; afocal relay optical systems, each including a front lens unit with positive refracting power and a rear lens unit with positive refracting power and having an intermediate image between the front lens unit and the rear lens unit; variable magnification optical systems; a plurality of aperture stops including at least aperture stops for right and left eyes, located at positions decentered from the optical axis of the objective lens system; and a plurality of imaging lens systems located at positions corresponding to the plurality of aperture stops. In this case, when each of the variable magnification optical systems lies at the low-magnification position, an entrance pupil of an optical system ranging from the objective lens system to each of the imaging lens systems is located closest to the objective lens system to satisfy the following condition:

$$0 < L\_enp\_w / f\_ob < 0.3$$

where $L\_enp\_w$ is a distance from the most object-side surface of the objective lens system where a working distance is shortest to the entrance pupil at the low-magnification position and $f\_ob$ is the focal length of the objective lens system where the working distance is shortest.

5 Claims, 19 Drawing Sheets

EVEN WHEN LATERAL DIMENSION IS SMALL AT THE SAME WD, WORKING SPACE WIDENS.

ENTRANCE PUPIL POSITION

TOP OF OBSERVATION LENS BARRELL

OFF-AXIS CHIEF RAYS

ENTRANCE PUPIL POSITION

WHEN ENTRANCE PUPIL POSITION IS CHANGED, HEIGHT OF OFF-AXIS CHIEF RAY AT TOP OF MICROSCOPE VARIES.

TOP OF OBSERVATION LENS BARREL

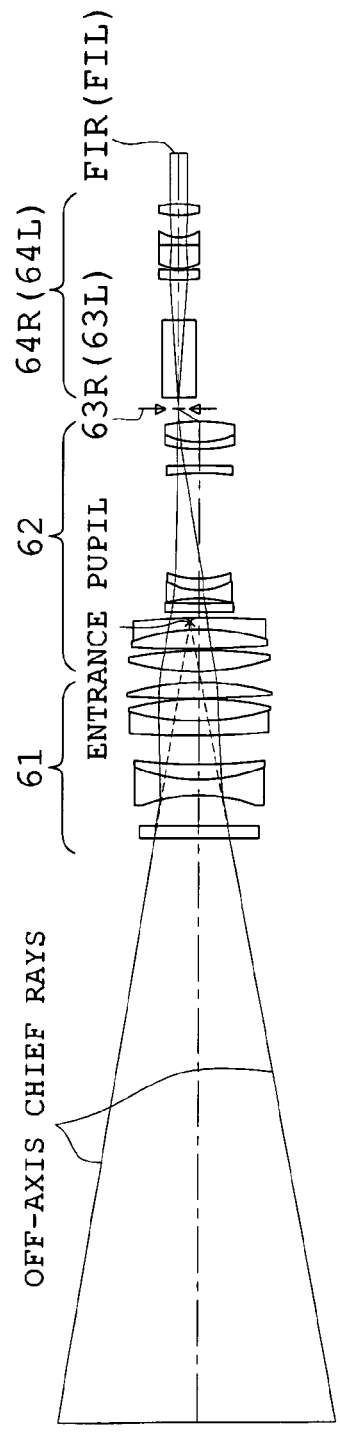
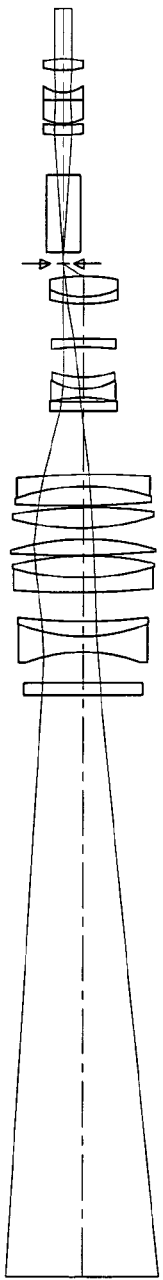
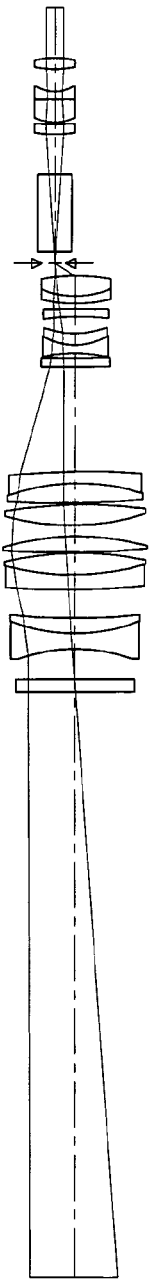
FIG. 4A
FIG. 4B
FIG. 4C

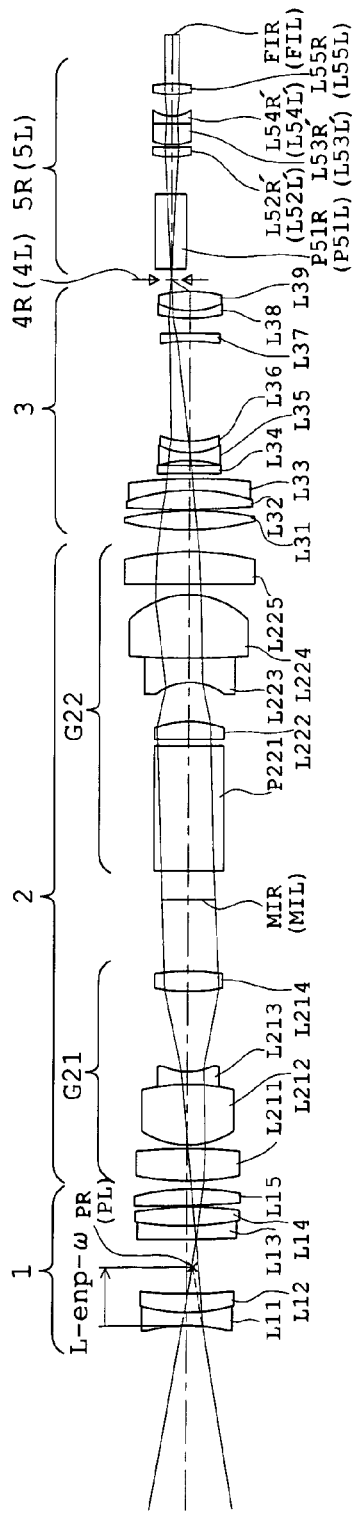
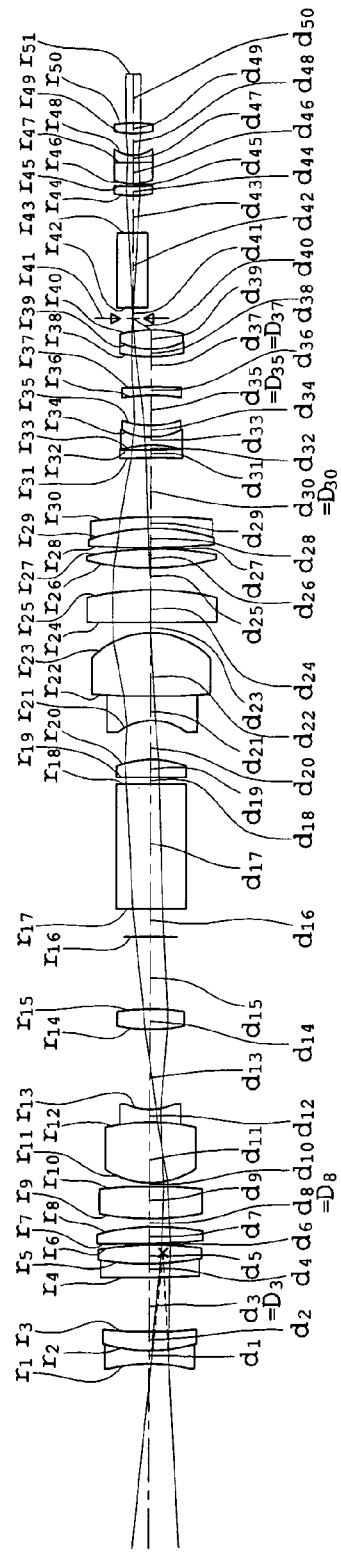
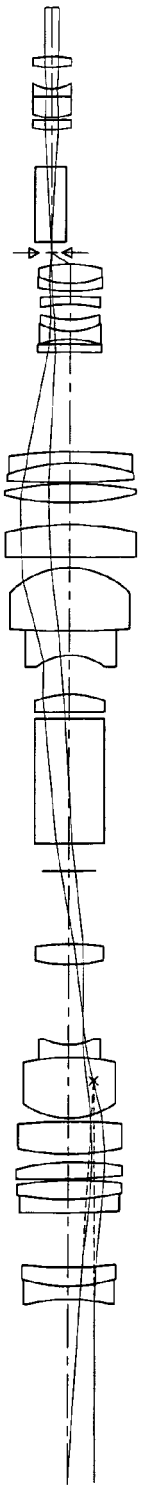
FIG. 18A
FIG. 18B
FIG. 18C

STEREOMICROSCOPE

This application claims benefits of Japanese Application No. 2007-4914 filed in Japan on Jan. 12, 2007, the contents of which are incorporated herein by reference.

BACKGROUND OF THE INVENTION

1. Field of the Invention

This invention relates to a stereomicroscope, and in particular, to a stereomicroscope used as a surgical microscope.

2. Description of Related Art

Stereomicroscopes are used in wide fields of researches, examinations, and surgical operations because minute parts of observation objects can be captured as three-dimensional images.

In the stereomicroscope, it is desired as one of main requirements to ensure a wide working space of a viewer. In particular, in the surgical microscope, besides ensuring a long working distance (WD) in order to obtain a working space for viewers (a chief operator and assistants), it is important to reduce a lateral dimension of an observation lens barrel. Specifically, in the surgical microscope, the viewer can ensure a wider substantial working space, for example, when an observation lens barrel 51' shown in FIG. 1B is smaller in the lateral dimension than an observation lens barrel 51 shown in FIG. 1A, even though the working distances are identical.

In the stereomicroscope, optical factors determining the lateral dimension of the observation lens barrel are as follows:

(1) An internal inclination angle made by right and left observation optical systems (for eyes)

(2) A field angle of each observation optical system (3) An NA (a numerical aperture) of each observation optical system (4) An entrance pupil position of each observation optical system However, that the internal inclination angle made by the right and left observation optical systems is made small becomes advantageous in reducing the lateral dimension of the observation lens barrel, but it impairs the performance of stereoscopic vision and thus is unfavorable.

Further, that the field angle of each observation optical system is made small becomes advantageous in reducing the lateral dimension of the observation lens barrel, but it narrows an observation range and thus is unfavorable.

Still further, that the NA of each observation optical system is made small becomes advantageous in reducing the lateral dimension of the observation lens barrel, but it darkens an observation image obtained through the observation optical system to degrade resolution and thus is unfavorable.

The entrance pupil position of each observation optical system varies with the arrangement of optical elements constituting the observation optical system. The lateral dimension of the observation lens barrel is affected by the entrance pupil position.

FIGS. 2A and 2B show relationships between the entrance pupil position of each observation optical system and the lateral dimension of the observation lens barrel in an arrangement that the entrance pupil position lies inwardly away from the top of the observation lens barrel and an arrangement that the entrance pupil position lies close to the top of the observation lens barrel, respectively.

In order to maintain the performance of favorable stereoscopic vision, it is necessary that the internal inclination angle made by the right and left observation optical systems, as mentioned above, is kept at a preset angle. Hence, in FIGS. 2A and 2B, the internal inclination angle made by the right and left observation optical systems is fixed at a preset angle θ so that the entrance pupil position is varied.

An arrangement that the entrance pupil position lies close to the top of the observation lens barrel as shown in FIG. 2B, in contrast with the arrangement that the entrance pupil position lies inwardly away from the top of the observation lens barrel as shown in FIG. 2A, requires less height of an off-axis chief ray at the top of the observation lens barrel, and therefore, the lateral dimension of the observation lens barrel can be reduced.

FIGS. 3A-3C and FIGS. 4A-4C show arrangement examples of common stereomicroscopes at low-magnification, middle-magnification, and high-magnification positions. Also, in FIGS. 3A-3C and FIGS. 4A-4C, only one optical system for the right eye is conveniently shown with respect to the stereomicroscope provided with optical systems for right and left eyes. In the optical system for the right eye, "R" is attached to a corresponding reference numeral, while in the optical system for the left eye, "L" is attached.

The stereomicroscope shown in FIGS. 3A-3C includes, in order from the object side, a single objective lens system 61; an afocal zoom optical system 62R (62L) which is one of a pair of right and left afocal zoom optical systems, located at a position decentered from the optical axis of the objective lens system 61; an aperture stop 63R (63L) which is one of a pair of right and left aperture stops, located at a position corresponding to the afocal zoom optical system 62R (62L); and an imaging lens system 64R (64L) which is one of a pair of right and left imaging lens systems, located at a position corresponding to the aperture stop 63R (63L). Also, in FIGS. 3A-3C, reference symbol FIR (FIL) represents an imaging position.

Here, in the case where observation is carried out by an optical microscope, an eyepiece system (not shown) which is one of a pair of right and left eyepiece systems is placed behind the imaging position FIR (FIL) which is one of a pair of right and left imaging positions, and an optical image formed through the imaging lens system 64R (64L) is observed through the eyepiece system. In the case of the observation by an electronic microscope, an electronic image sensor (not shown) which is one of a pair of right and left electronic image sensors is located at the imaging position FIR (FIL), and an optical image picked up by the electronic image sensor is converted into an electric signal so that an image displayed through a spectacles- or screen-type stereoscopic display device (not shown) is observed.

Also, in this description, a combination of optical elements ranging from the objective lens system to each of the imaging lens systems is referred to as the observation optical system.

The stereomicroscope of FIGS. 4A-4C is constructed so that the afocal zoom optical system of FIGS. 3A-3C is common to right and left optical systems, and has the single objective lens system 61; a single afocal zoom optical system 62; the aperture stop 63R (63L) which is one of a pair of right and left aperture stops, located at a position decentered from the optical axis of the afocal zoom optical system 62; and the imaging lens system 64R (64L) which is one of a pair of right and left imaging lens systems, located at a position corresponding to the aperture stop 63R (63L). An observation technique is the same as in FIGS. 3A-3C.

In the stereomicroscope of each of two conventional examples mentioned above, the aperture stop 63R (63L) is located relatively to the image side in the observation optical system, and the entrance pupil position of the observation optical system lies at a considerable distance away from the objective lens system 61 toward the image side. Consequently, the height of the off-axis chief ray passing through the objective lens system 61 is increased and in particular, reaches a maximum at the low-magnification position where the field angle becomes largest.

In conventional stereomicroscopes, unlike the stereomicroscopes shown in FIGS. 3A-3C and FIGS. 4A-4C, ones taking account of the entrance pupil positions are proposed, for example, in Japanese Patent Kokai Nos. 2006-158452 and 2006-194976.

The stereomicroscope set forth in Kokai No. 2006-158452 is constructed so that the entrance pupil position is made to lie between an objective optical system and an observation object (an object to be observed) and thereby favorable accommodation is obtained.

In the stereomicroscope set forth in Kokai No. 2006-194676, the object side of the observation optical system is designed to be telecentric so that the entrance pupil position of the observation optical system is made infinite, and in addition, an attempt is made to achieve compactness of the optical system.

SUMMARY OF THE INVENTION

The stereomicroscope according to the present invention comprises, in order from the object side, a single objective lens system; afocal relay optical systems, each including a front lens unit with positive refracting power and a rear lens unit with positive refracting power and having an intermediate image between the front lens unit and the rear lens unit; variable magnification optical systems; a plurality of aperture stops including at least aperture stops for right and left eyes, located at positions decentered from the optical axis of the objective lens system; and a plurality of imaging lens systems located at positions corresponding to the plurality of aperture stops. In this case, when each of the variable magnification optical systems lies at the low-magnification position, an entrance pupil of an optical system ranging from the objective lens system to each of the imaging lens systems is located closest to the objective lens system to satisfy the following condition:

$$0 < L\_enp\_w / f\_ob < 0.3 \qquad (1)$$

where $L\_enp\_w$ is a distance from the most object-side surface of the objective lens system where a working distance is shortest to the entrance pupil at the low-magnification position, in which a symbol where the entrance pupil is located on the image side of the most object-side surface of the objective lens system is taken as a positive, and $f\_ob$ is the focal length of the objective lens system where the working distance is shortest.

In the stereomicroscope of the present invention, it is desirable to satisfy the following condition:

$$0.5 < f\_rf / f\_rr < 0.9 \qquad (2)$$

where $f\_rf$ is the focal length of the front lens unit of each of the afocal relay optical systems and $f\_rr$ is the focal length of the rear lens unit of each of the afocal relay optical systems.

In the stereomicroscope of the present invention, it is desirable to satisfy the following condition:

$$0.1 < f\_rf / f\_ob < 0.4 \qquad (3)$$

In the stereomicroscope of the present invention, it is desirable to further comprise an illumination optical system placed in the proximity of the entrance pupil of the optical system ranging from the objective lens system to one of the imaging lens systems to satisfy the following condition:

$$-0.1 < \Delta z / f\_ob < 0.3 \qquad (4)$$

where $\Delta z$ is a distance from the most object-side surface of the illumination optical system where the working distance is shortest to the entrance pupil at the low-magnification position, in which a symbol where the entrance pupil is located on the image side of the most object-side surface of the illumination optical system is taken as a positive.

Further, the stereomicroscope according to the present invention comprises, in order from the object side, a single objective lens system; afocal relay optical systems, each including a front lens unit with positive refracting power and a rear lens unit with positive refracting power and having an intermediate image between the front lens unit and the rear lens unit; variable magnification optical systems; a plurality of aperture stops including at least aperture stops for right and left eyes, located at positions decentered from the optical axis of the objective lens system; and a plurality of imaging lens systems located at positions corresponding to the plurality of aperture stops. In this case, an illumination optical system is located in the proximity of an entrance pupil of an optical system ranging from the objective lens system to one of the imaging lens systems and when each of the variable magnification optical systems lies at the low-magnification position, the entrance pupil of the optical system ranging from the objective lens system to each of the imaging lens systems is located closest to the objective lens system to satisfy Conditions (1)-(4).

According to the present invention, the stereomicroscope in which the lateral dimension of the observation lens barrel at the top can be minimized and a wide working range of a viewer can be ensured is obtained.

These and other features and advantages of the present invention will become apparent from the following detailed description of the preferred embodiments when taken in conjunction with the accompanying drawings.

BRIEF DESCRIPTION OF THE DRAWINGS

FIGS. 4A, 4B, and 4C are sectional views showing another example of arrangements, developed along the optical axis, at low-magnification, middle-magnification, and high-magnification positions, respectively, of a conventional common stereomicroscope;

FIGS. 18A, 18B, and 18C are sectional views showing optical arrangements, developed along the optical axis, at low-magnification, middle-magnification, and high-magnification positions, respectively, where the working distance is 100 mm, in the observation optical system of the stereomicroscope according to Embodiment 4 of the present invention;

DETAILED DESCRIPTION OF THE PREFERRED EMBODIMENTS

Figure 1A:
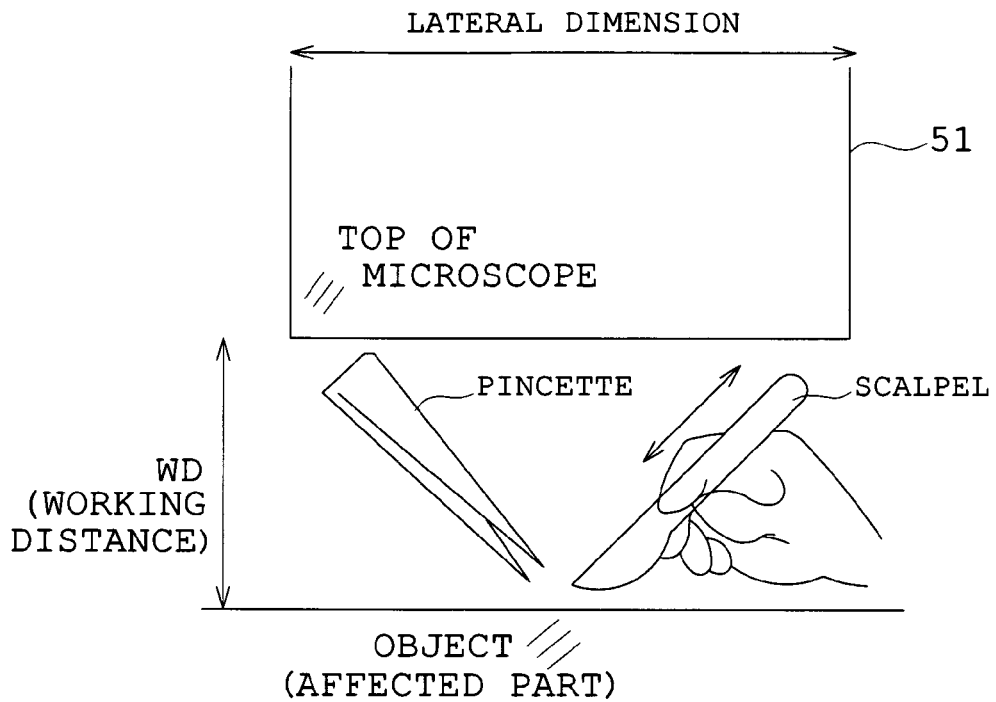
FIGS. 1A and 1B are explanatory views conceptually showing relationships between the lateral dimension of the observation lens barrel of a surgical microscope and the working space of a viewer in cases where the lateral dimension the observation lens barrel is large and it is small, respectively.
Figure 1B:
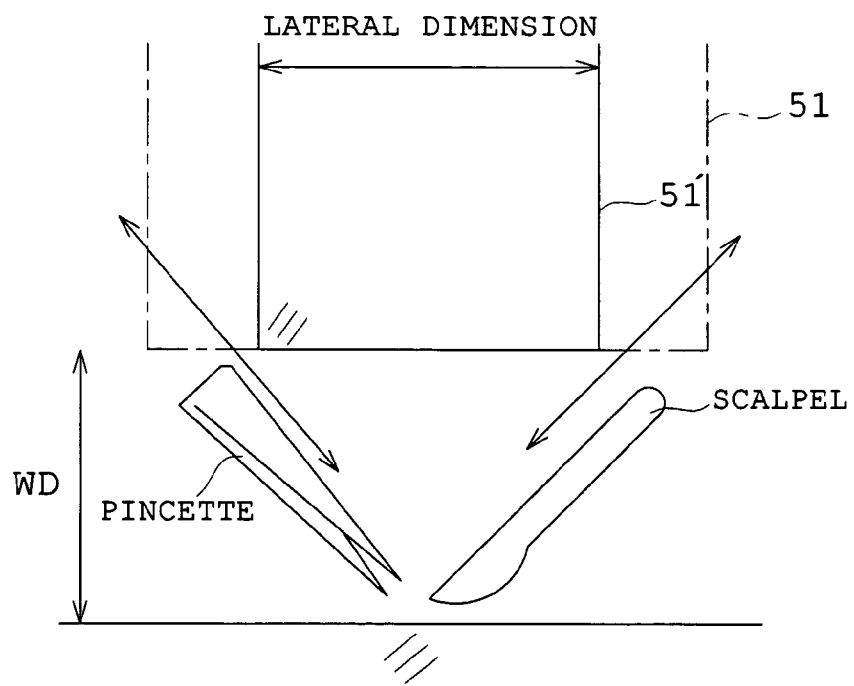
Figure 2A:
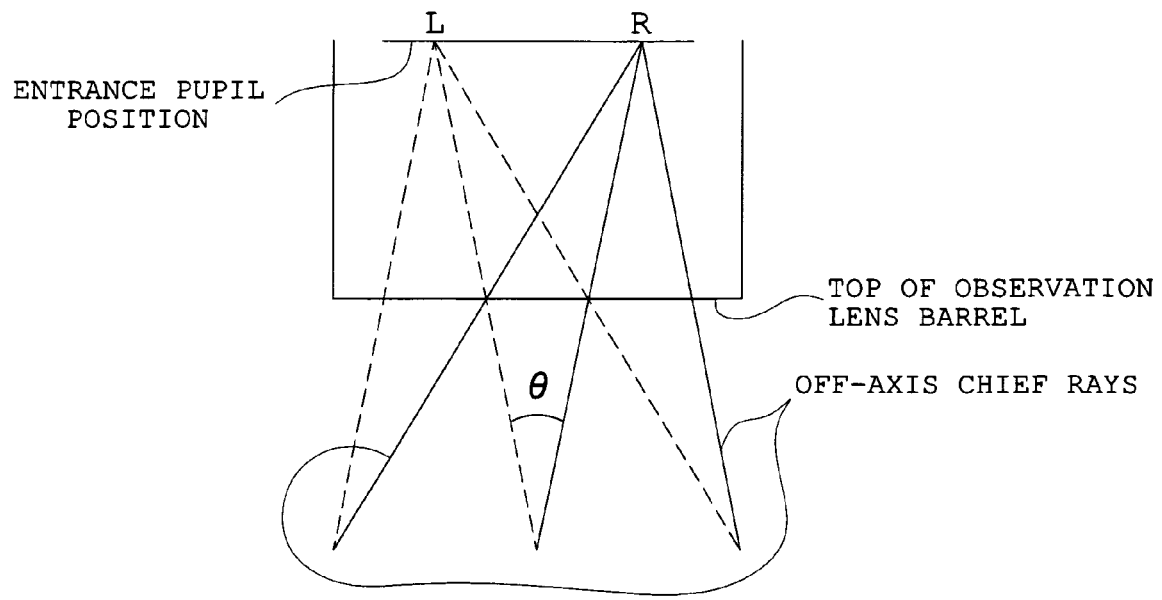
FIGS. 2A and 2B are explanatory views showing relationships between the entrance pupil position of each observation optical system and the lateral dimension of the observation lens barrel in an arrangement that the entrance pupil position lies inwardly away from the top of the observation lens barrel and an arrangement that it lies close to the top of the observation lens barrel, respectively.
Figure 2B:
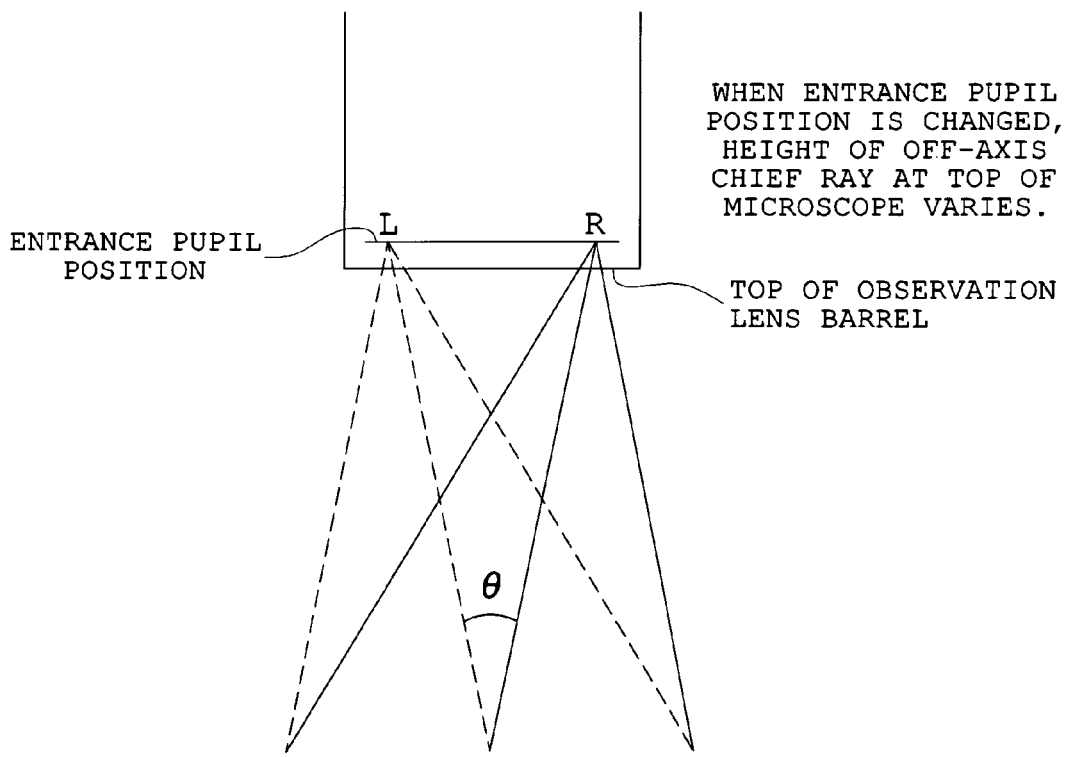
Figure 3A:
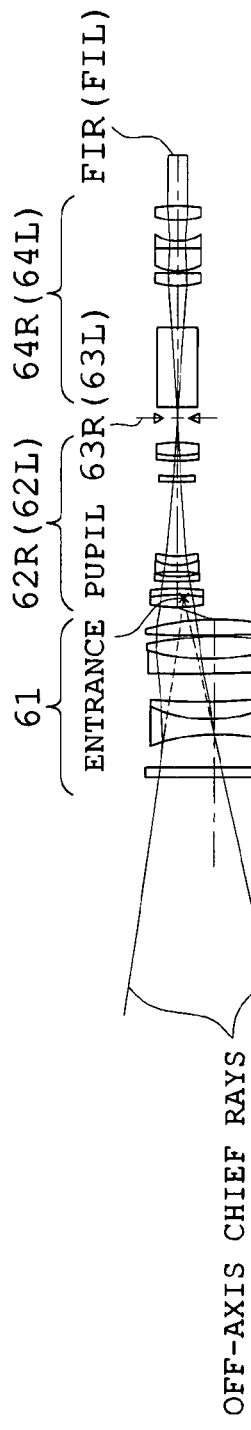
FIGS. 3A, 3B, and 3C are sectional views showing an example of arrangements, developed along the optical axis, at low-magnification, middle-magnification, and high-magnification positions, respectively, of a conventional common stereomicroscope.
Figure 3B:
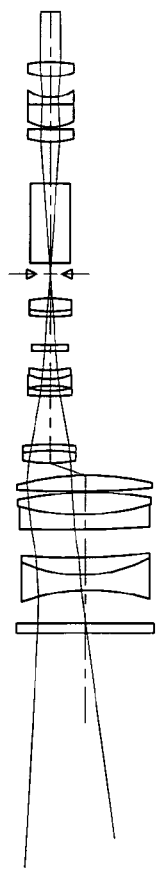
Figure 3C:
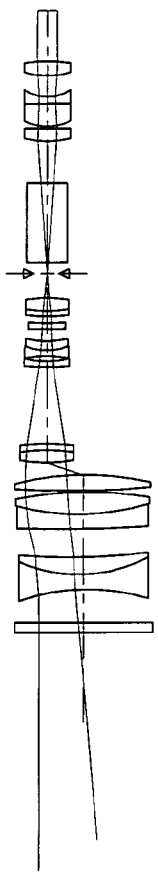

Before undertaking the description of the embodiments, the function and effect of the present invention will be explained.

The stereomicroscope of the present invention comprises, in order from the object side, a single objective lens system; afocal relay optical systems, each including a front lens unit with positive refracting power and a rear lens unit with positive refracting power and having an intermediate image between the front lens unit and the rear lens unit; variable magnification optical systems; a plurality of aperture stops including at least aperture stops for right and left eyes, located at positions decentered from the optical axis of the objective lens system; and a plurality of imaging lens systems located at positions corresponding to the plurality of aperture stops. In this case, when each of the variable magnification optical systems lies at the low-magnification position, an entrance pupil of an optical system ranging from the objective lens system to each of the imaging lens systems is located closest to the objective lens system and satisfies Condition (1).

In the present invention, the afocal relay optical systems are interposed between the objective lens system and the variable magnification optical systems so that images of the aperture stops are projected at the entrance pupil position. However, the arrangement alone of the afocal relay optical systems is not adequate for reducing the lateral dimension of the observation lens barrel. That is, in order to reduce the lateral dimension of the observation lens unit, it is important that the variable magnification position of each variable magnification optical system and the entrance pupil position of each observation optical system satisfy conditions described below at the same time.

Specifically, it is most effective for a compact design of the neighborhood of the top of the stereomicroscope that when the variable magnification optical system is located at the low-magnification position, the entrance pupil position of the observation optical system lies in the optical path of the objective lens system or in the optical path between the objective lens system and the afocal relay optical system.

More specifically, it is important to satisfy Condition (1).

The entrance pupil position varies with a magnification change due to the variable magnification optical system. Even though the image of the aperture stop is projected in such a way that the entrance pupil position is made to lie in the proximity of the objective lens system at a position other than the low-magnification position, for example, at the high-magnification position, the effect of minimizing the top of the stereomicroscope is small at the high-magnification position where the height of the off-axis chief ray is low. When the image of the aperture stop is projected in such away that the entrance pupil position is made to lie in the proximity of the objective lens system at the low-magnification position where the height of the off-axis chief ray is maximum, the effect of minimizing the top of the stereomicroscope becomes most pronounced.

Beyond the upper limit of Condition (1), the entrance pupil position is shifted toward the image side at the low-magnification position and the height of the off-axis chief ray cannot be lowered.

On the other hand, below the lower limit of Condition (1), the entrance pupil position approaches the objective lens system at the high-magnification position, but it is considerably shifted toward the object side at the low-magnification position so that the height of the off-axis chief ray is increased, and thus this is unfavorable.

In the stereomicroscope of the present invention, it is desirable to satisfy Condition (2).

Condition (2) determines the afocal magnification of the afocal relay optical system, needed to reduce the lateral dimension of the observation lens barrel while keeping a sufficient field angle.

The afocal magnification is defined by the equation $$\text{Afocal magnification} = \gamma = f\_rf / r\_rr = \tan U' / \tan U \quad (a)$$

where U is an angle of a chief ray incident on the afocal relay optical system and U' is an angle of the chief ray emergent from the afocal relay optical system.

In the stereomicroscope of the present invention, the afocal magnification is set to take a value smaller than 1 so as to satisfy Condition (2).

The angle U' of the chief ray emergent from the afocal relay optical system is also the angle of the chief ray incident on the variable magnification optical system. When the ray passes through the afocal relay optical system, with the observation optical system having a large field angle, the field angle becomes smaller with respect to the variable magnification optical system and hence the height of the off-axis ray around the variable magnification optical system can be kept to a minimum. When Condition (2) is satisfied, the insurance of the field angle of the observation optical system is advantageously compatible with the compact design of the neighborhood of the variable magnification optical system.

Beyond of the upper limit of Condition (2), this is disadvantageous to the insurance of the field angle. Alternatively, the field angle of the variable magnification optical system enlarges and the height of the off-axis ray around the variable magnification optical system is increased, which becomes disadvantageous to the compact design of the neighborhood of the variable magnification optical system.

On the other hand, below the lower limit of Condition (2), this is advantageous for the insurance of the field angle, but becomes disadvantageous to the projection of the entrance pupil position in the proximity of the objective lens system and the upper limit of Condition (1) is liable to be exceeded. Alternatively, the overall length of the afocal relay optical system tends to increase, which is unfavorable.

In the stereomicroscope of the present invention, it is desirable to satisfy Condition (3).

Condition (3) is related to the optical performance and compactness of the observation optical system and defines the size of the intermediate image formed through the objective lens system and the front lens unit of the afocal relay optical system.

Below the lower limit of Condition (3), the size of the intermediate image becomes so small that a reimaging magnification needs to be increased on the image side of the intermediate image. This enlarges the aberration of the optical system and thus is unfavorable.

On the other hand, beyond the upper limit of Condition (3), the size of the intermediate image becomes so large that it becomes disadvantageous to the compact design of the neighborhood of the afocal relay optical system.

In the stereomicroscope of the present invention, it is desirable that the illumination optical system is placed in the proximity of the entrance pupil of the optical system ranging from the objective lens system to one of the imaging lens systems and satisfies Condition (4).

In addition to optimizing the observation optical system, it is also important for compactness of the observation lens barrel to optimize the illumination optical system.

Thus, in the observation optical system satisfying Condition (1) like the present invention, it is desirable to place the illumination optical system so as to satisfy Condition (4) as well.

Condition (4) is related to the arrangement of the illumination optical system and determines the position of the observation optical system in the direction of the optical axis.

Figure 5:
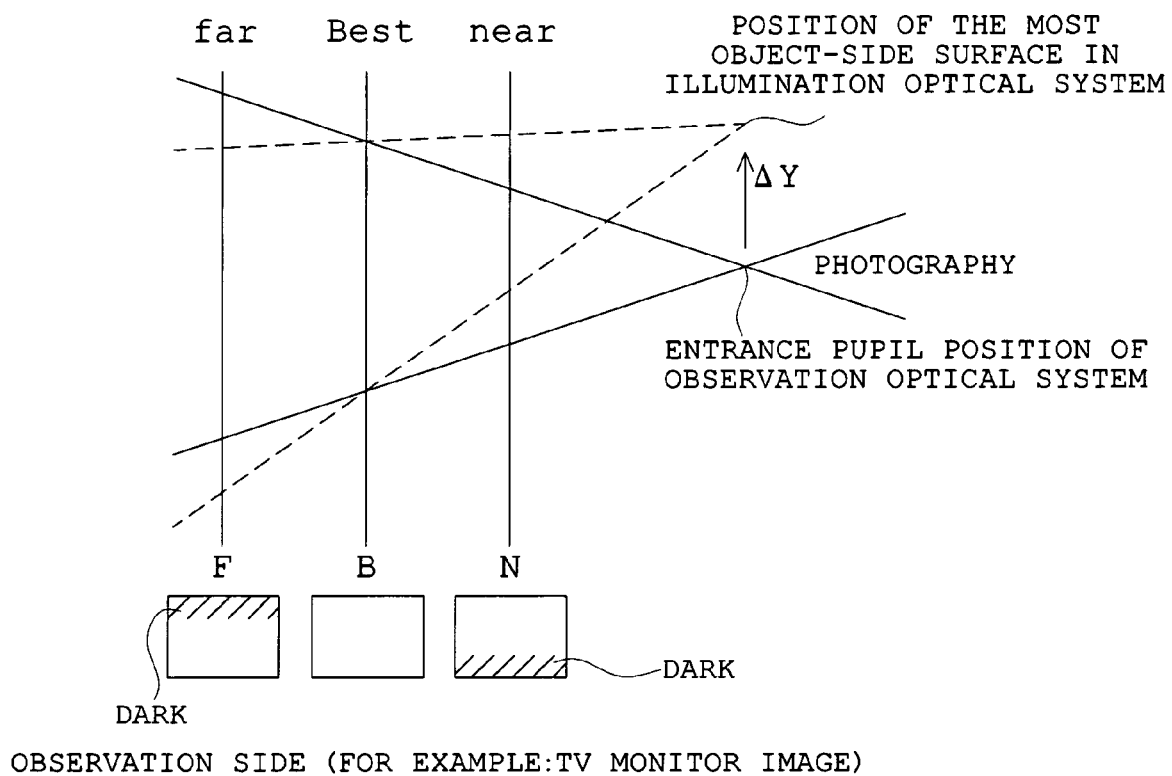
FIG. 5 is a conceptual view showing illumination efficiency and light distribution in a state where the alignment of the observation optical system and the illumination optical system is extremely impaired in the stereomicroscope.
Figure 6:
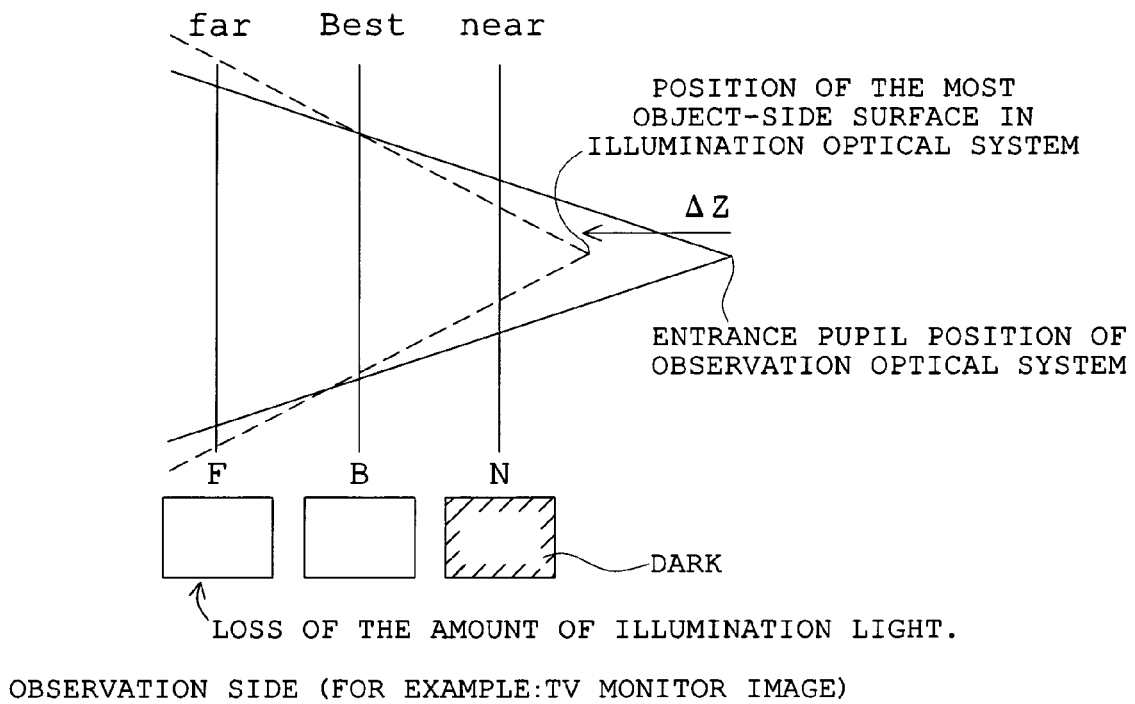
FIG. 6 is a conceptual view showing illumination efficiency and light distribution in a state where the most object-side lens surface of the illumination optical system lies at a considerable distance away from the entrance pupil of the observation optical system toward the object side in the stereomicroscope.
Figure 7:
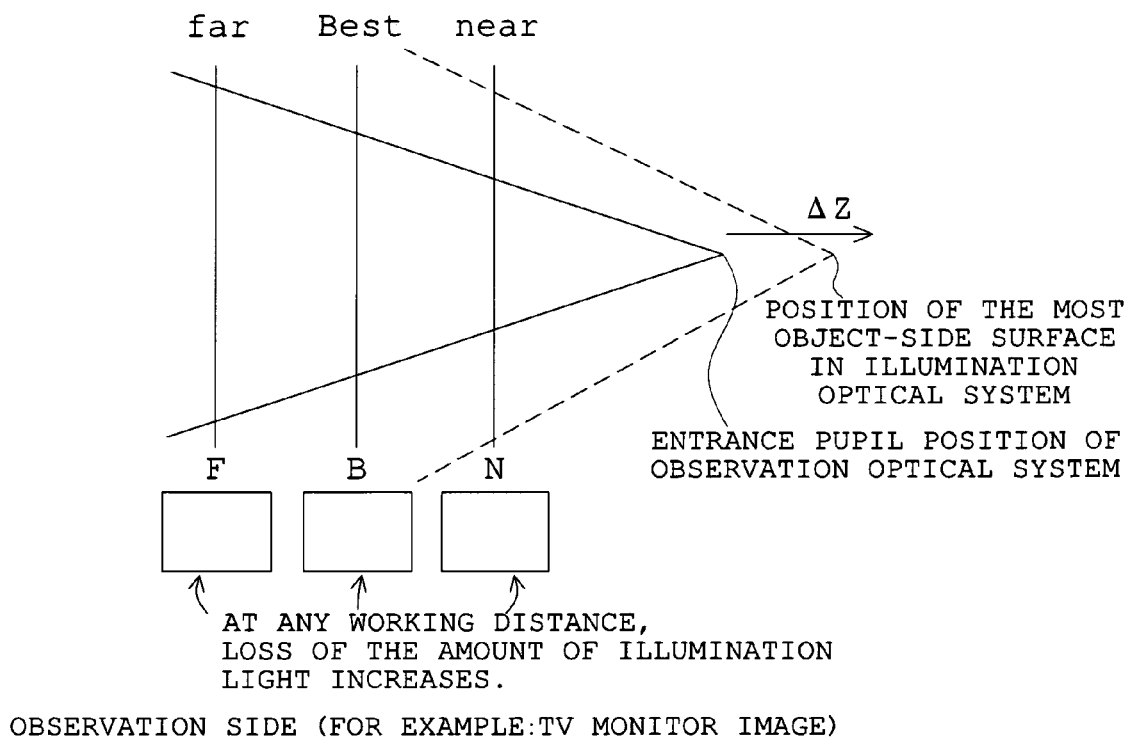
FIG. 7 is a conceptual view showing illumination efficiency and light distribution in a state where the most object-side lens surface of the illumination optical system lies at a considerable distance away from the entrance pupil of the observation optical system toward the image side in the stereomicroscope.

For example, as illustrated in FIG. 5, in an arrangement in which the alignment of the observation optical system and the illumination optical system is extremely impaired or as illustrated in FIG. 6, in an arrangement in which the most object-side lens surface of the illumination optical system lies at a considerable distance away from the entrance pupil of the observation optical system toward the object side, the light distribution and illumination efficiency are impaired in either case, with the exception of the optimum working distance. As shown in FIG. 7, in an arrangement in which the most object-side lens surface of the illumination optical system lies at a considerable distance away from the entrance pupil of the observation optical system toward the image side, the illumination efficiency is impaired at any working distance.

However, when Condition (1) is satisfied, the compact design of the observation optical system can be achieved, and hence it becomes easy to bring the illumination optical system close to the optical axis of the observation optical system and the alignment becomes favorable. When Condition (4) is further satisfied, the illumination optical system can be optimized with respect to the light distribution and illumination efficiency.

Below the lower limit of Condition (4), a state such as that shown in FIG. 7 is brought about, while beyond the upper limit of Condition (4), a state such as that shown in FIG. 6 occurs, which is unfavorable.

In the stereomicroscope of the present invention constructed as mentioned above, it is also possible to add arrangements described below.

In order that a chief viewer (a chief operator) and a sub-viewer (an assistant) carry out stereoscopic observations at the same time, it is good practice, for example, to arrange a pair of right and left observation optical systems and another pair of right and left observation optical systems perpendicular thereto. In doing so, besides the observation direction of the chief viewer, the stereoscopic observation can also be made along a direction perpendicular to the observation direction of the chief viewer.

Optical systems to be added, besides optical systems for stereoscopic observation of the sub-viewer, may be provided, for example, as observation optical systems for carrying out the two-dimensional observation of special light, such as infrared light, at the upper or lower position of the pair of right and left observation optical systems.

In accordance with the drawings, the embodiments of the stereomicroscope of the present invention will be explained below.

Embodiment 1

Figure 8:
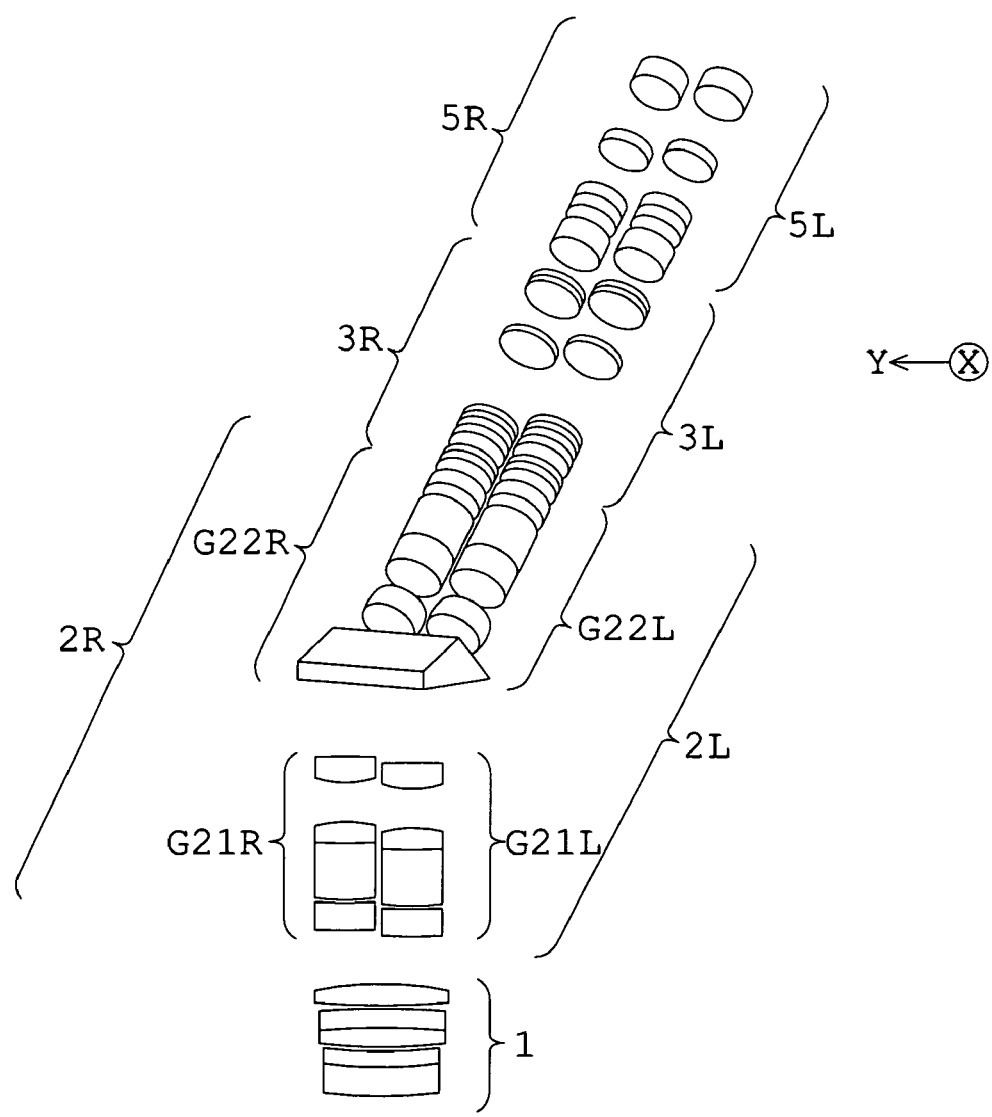
FIG. 8 is a perspective view showing a schematic arrangement of the stereomicroscope according to Embodiment 1 of the present invention.
Figure 9:
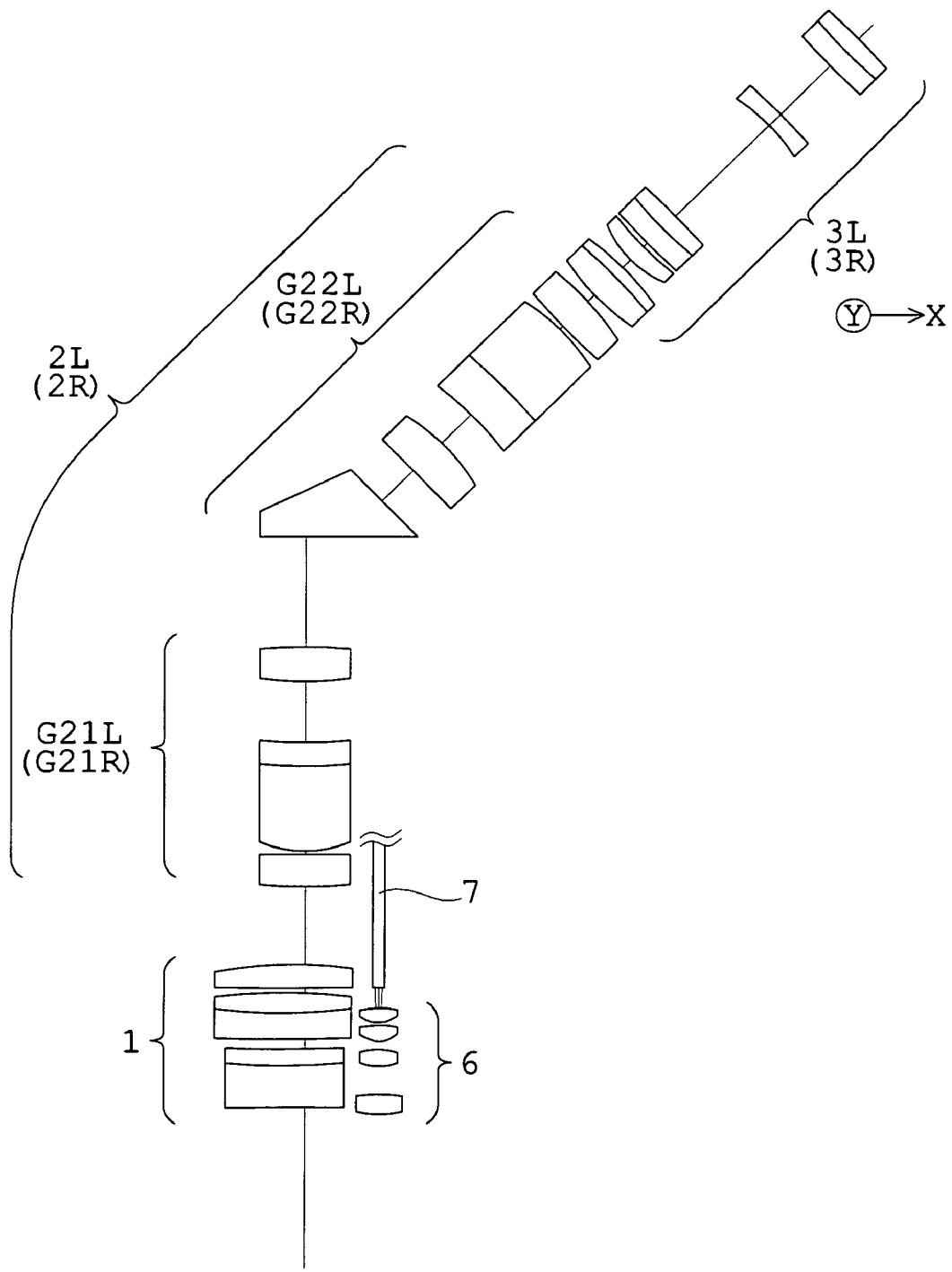
FIG. 9 is a partial side view of the stereomicroscope of FIG. 8.
Figure 10:
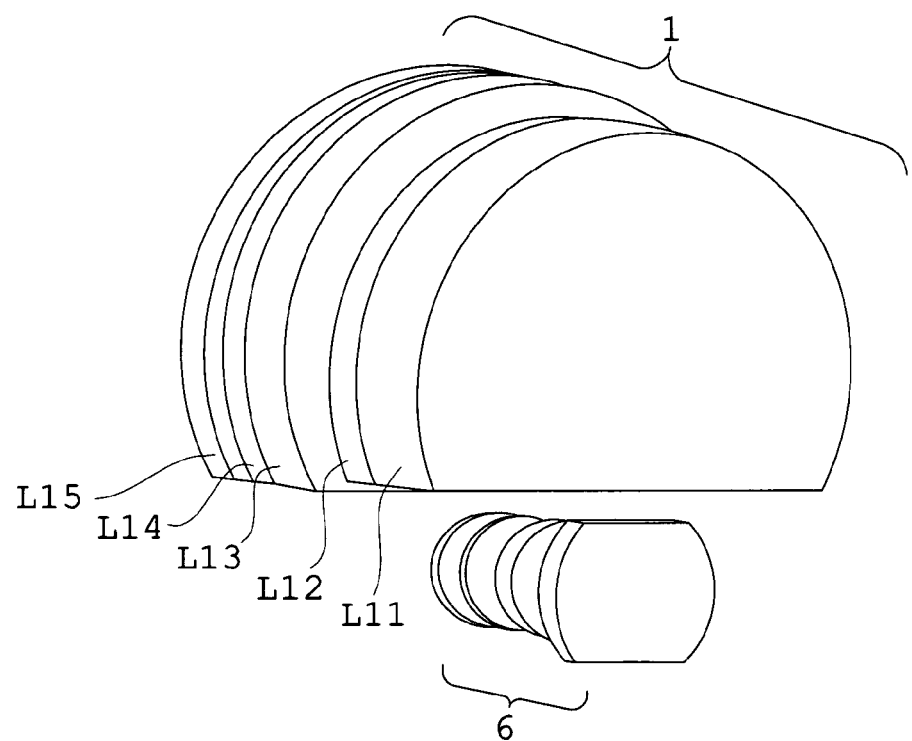
FIG. 10 is a partially enlarged perspective view showing the arrangement of the top, viewed from the front and left, of the stereomicroscope of FIG. 8.
Figure 11A:
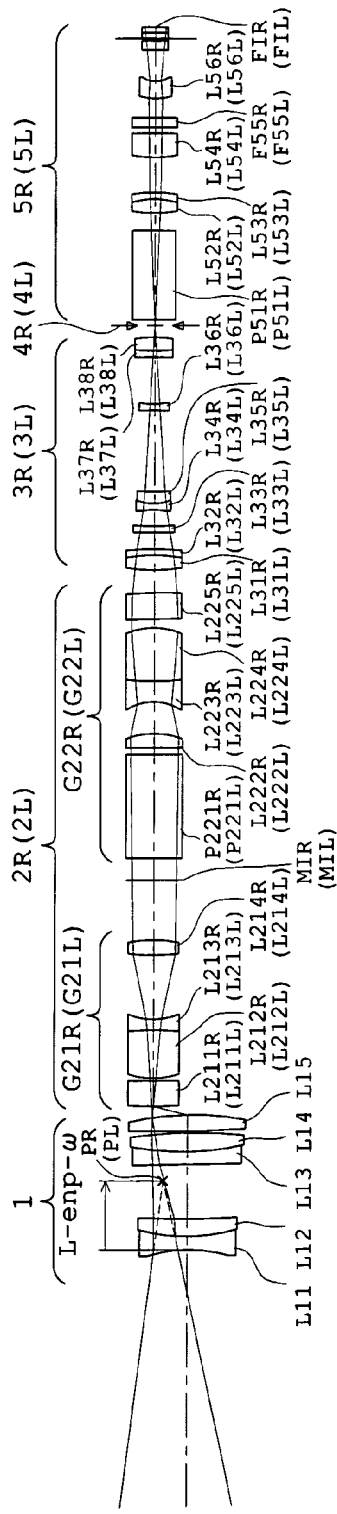
FIGS. 11A, 11B, and 11C are sectional views showing optical arrangements, developed along the optical axis, at low-magnification, middle-magnification, and high-magnification positions, respectively, where the working distance is 100 mm, in the observation optical system of the stereomicroscope according to Embodiment 1 of the present invention.
Figure 11B:
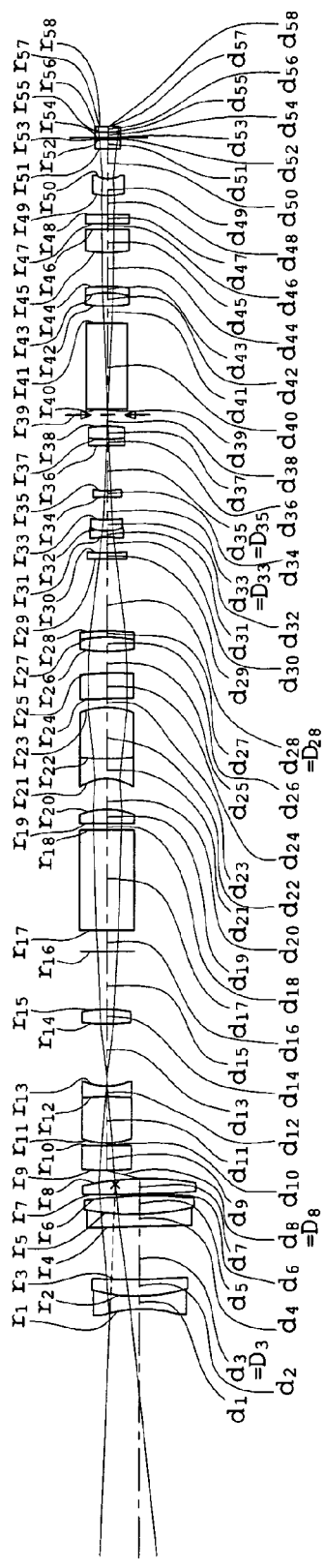
Figure 11C:
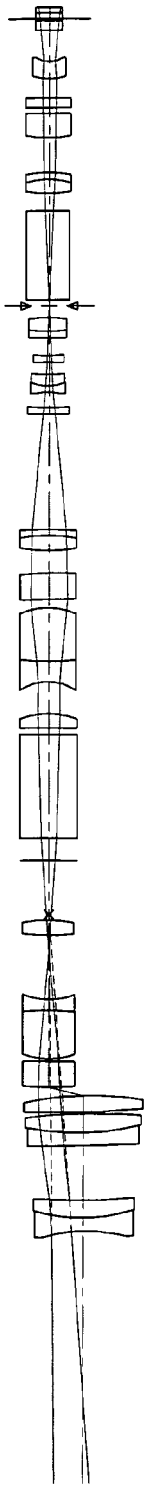
Figure 12:
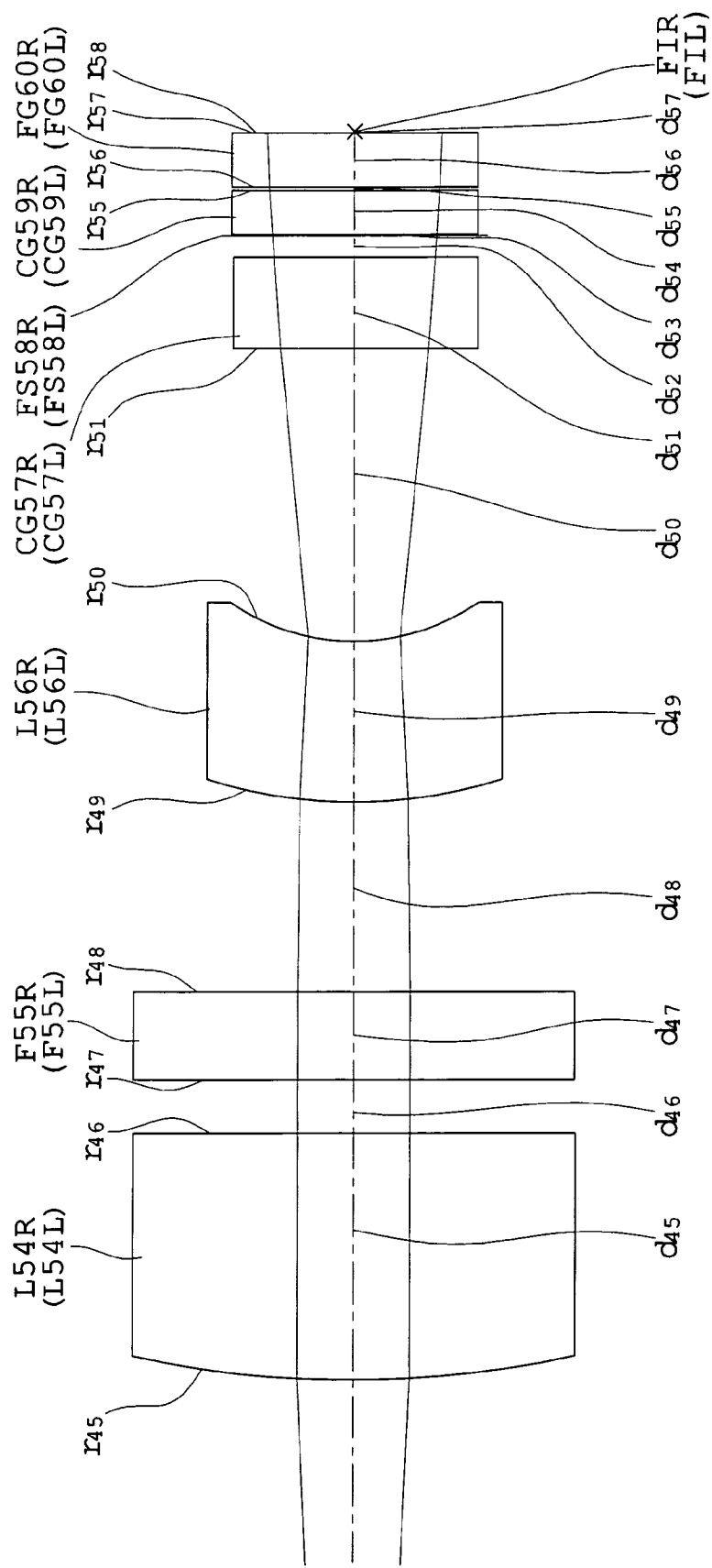
FIG. 12 is a partially enlarged view showing an optical arrangement near the imaging plane in the observation optical system of the stereomicroscope of FIGS. 11A-11C.

FIG. 8 shows a schematic arrangement of the stereomicroscope according to Embodiment 1 of the present invention. FIG. 9 shows a part of the stereomicroscope of FIG. 8. FIG. 10 shows the arrangement of the top of the stereomicroscope of FIG. 8. FIGS. 11A-11C show optical arrangements of the observation optical system of the stereomicroscope according to Embodiment 1 of the present invention. FIG. 12 shows a part of an optical arrangement near the imaging plane in the observation optical system of the stereomicroscope of FIGS. 11A-11C. Also, in FIGS. 11A-11C, only one optical system is conveniently shown with respect to optical systems for right and left eyes.

In the optical system for the right eye, "R" is attached to a corresponding reference numeral, while in the optical system for the left eye, "L" is attached. Reference symbol FIR (FIL) represents the position of the final imaging plane. These are also used in individual embodiments.

The stereomicroscope of Embodiment 1 has the observation optical systems and the illumination optical system.

The observation optical system comprises, in order from the object side, a single objective lens system 1; an afocal relay optical system 2R (2L) which is one of a pair of right and left afocal relay optical systems; a variable magnification optical system 3R (3L) which is one of a pair of right and left variable magnification optical systems; an aperture stop 4R (4L) which is one of a pair of right and left aperture stops; and an imaging lens system 5R (5L) which is one of a pair of right and left imaging lens systems.

The objective lens system 1 includes, in order from the object side, a cemented doublet of a biconcave lens L11 and a positive meniscus lens L12 with a convex surface facing the object side, a cemented doublet of a plano-concave lens L13 whose object-side surface is flat and whose image-side surface is concave and a biconvex lens L14, and a biconvex lens L15.

Each of lenses of the objective lens system 1, as shown in FIGS. 9 and 10, is configured into a shape that its lower portion is straight cut by a preset amount.

The afocal relay optical system 2R (2L) is provided at a position decentered 6.25 mm from the optical axis of the objective lens system 1.

The afocal relay optical system 2R (2L) includes a front lens unit G21R (G21L) with positive refracting power and a rear lens unit G22R (G22L) with positive refracting power, and is constructed so that an intermediate image is formed between the front lens unit G21R (G21L) and the rear lens unit G22R (G22L). In FIGS. 11A-11C, reference symbol MIR (MIL) represents the position of the intermediate image on each of the right and left sides and PR (PL) represents the entrance pupil position of the observation optical system on each of the right and left sides.

The front lens unit G21R (G21L) has a biconvex lens L211R (L211L), a cemented doublet of a biconvex lens L212R (L212L) and a biconcave lens L213R (L213L), and a biconvex lens L214R (L214L).

The rear lens unit G22R (G22L) has a path bending prism P221R (P221L: also, in FIG. 8, the right and left path bending prisms are constructed as a single member, and in FIGS. 11A-11C, different symbols are used for parts of the right and left optical systems), a plano-convex lens L222R (L222L) whose object-side surface is flat and whose image-side surface is convex, a cemented doublet of a biconcave lens L223R (L223L) and a biconvex lens L224R (L224L), and a plano-convex lens L225R (L225L) whose object-side surface is flat and whose image-side surface is convex.

The variable magnification optical system 3R (3L) is located at a position corresponding to the afocal relay optical system 2R (2L).

The variable magnification optical system 3R (3L) includes a cemented doublet of a biconvex lens L31R (L31L) and a negative meniscus lens L32R (L32L) with a concave surface facing the object side, a negative meniscus lens L33R (L33L) with a convex surface facing the object side, a cemented doublet of a biconcave lens L34R (L34L) and a positive meniscus lens L35R (L35L) with a convex surface facing the object side, a biconcave lens L36R (L36L), and a cemented doublet of a negative meniscus lens L37R (L37L) with a convex surface facing the object side and a biconvex lens L38R (L38L).

The aperture stop 4R (4L) is provided at a position corresponding to the variable magnification optical system 3R (3L).

The imaging lens system 5R (5L) is provided at a position corresponding to the aperture stop 4R (4L).

The imaging lens system 5R (5L) includes a prism P51R (P51L), a cemented doublet of a biconvex lens L52R (L52L) and a negative meniscus lens L53R (L53L) with a concave surface facing the object side, a plano-convex lens L54R (L54L) whose object-side surface is convex and whose image-side surface is flat, an infrared cutoff filter F55R (F55L), a negative meniscus lens L56R (L56L) with a convex surface facing the object 10 side, a CCD cover glass CG57R (CG57L), a flare stop FS58R (FS58L), a CCD cover glass CG59R (CG59L), and a CCD seal glass FG60R (FG60L).

When a magnification change is carried out in the range from the low-magnification position to the high-magnification position, the variable magnification optical system 3R (3L) is such that the cemented doublet of the biconvex lens L31R (L31L) and the negative meniscus lens L32R (L32L) with the concave surface facing the object side is fixed in position; the negative meniscus lens L33R (L33L) with the convex surface facing the object side and the cemented doublet of the biconcave lens L34R (L34L) and the positive meniscus lens L35R (L35L) with the convex surface facing the object side are moved toward the image side so as to narrow a spacing between this cemented doublet and the biconcave lens L36R (L36L); the biconcave lens L36R (L36L), after being moved toward the object side, is moved toward the image side; and the cemented doublet of the negative meniscus lens L37R (L37L) with the convex surface facing the object side and the biconvex lens L38R (L38L) is fixed in position.

When focusing is performed, the cemented doublet of the plano-concave lens L13 whose object-side surface is flat and whose image-side surface is concave and the biconvex lens L14 and the biconvex lens L15 are moved along the optical axis.

The illumination optical system includes an illumination lens system 6 and a light guide 7.

Each of lenses of the illumination lens system 6, as shown in FIG. 10, is configured into a shape that its upper and lower portions are straight cut by preset amounts. The illumination lens system 6, as shown in FIG. 9, is placed below and in the proximity of the objective lens system 1 so that their optical axes are parallel.

Figure 13:
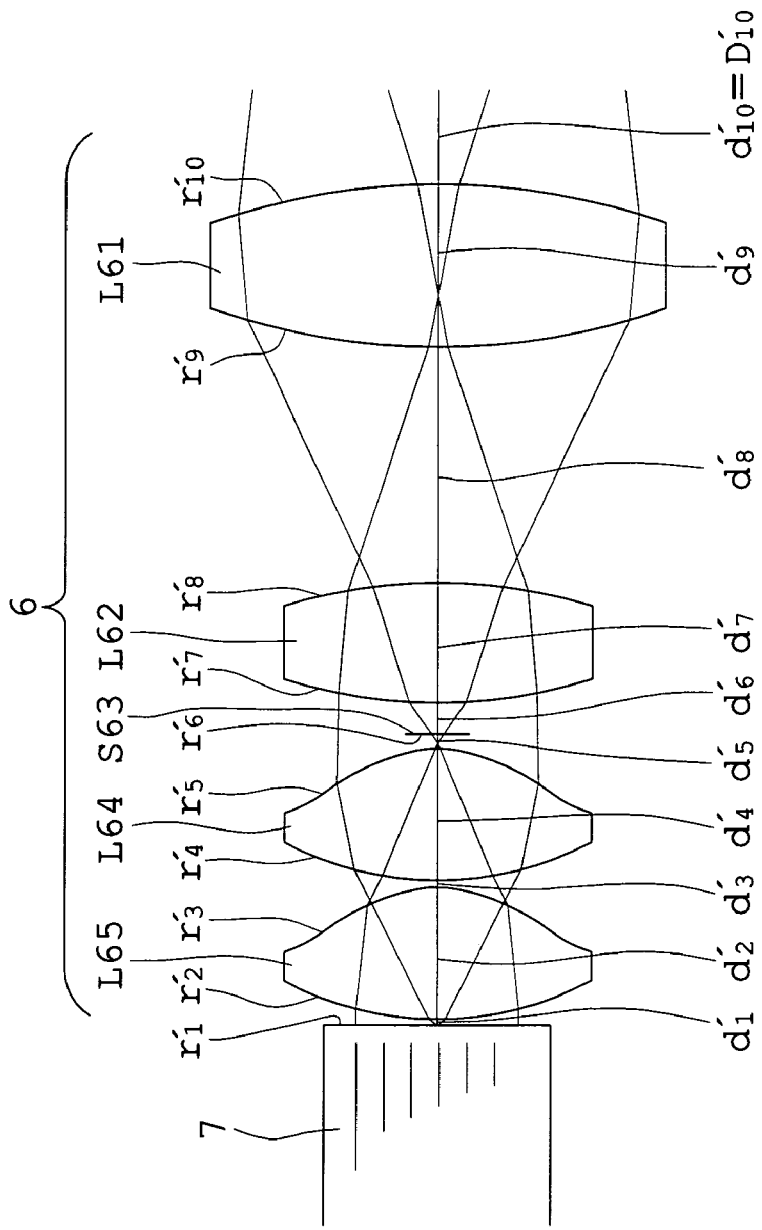
FIG. 13 is a partially sectional view showing a schematic arrangement, developed along the optical axis, of the illumination optical system in the stereomicroscope of Embodiment 1.

FIG. 13 shows a schematic arrangement of the illumination optical system in the stereomicroscope of Embodiment 1.

The illumination lens system 6 has, in order from object side, a biconvex lens L61, a biconvex lens L62, an aperture stop S63, a biconvex lens L64, and a biconvex lens L65.

The biconvex lenses L64 and L65 are constructed so that their object-side surfaces are aspherical.

The light guide 7 is connected to a light source, not shown. Also, in the illumination optical system applicable to the present invention, instead of the light guide 7 connected to the light source, not shown, an LED may be used.

Also, the illumination optical system shown in FIG. 13 is depicted so that an observation object lies on the right side on the basis of the end face of the light guide 7 (or the luminescent surface of the LED).

The illumination optical system can also be used as each of modified examples shown in FIGS. 14 and 15 described below.

Figure 14:
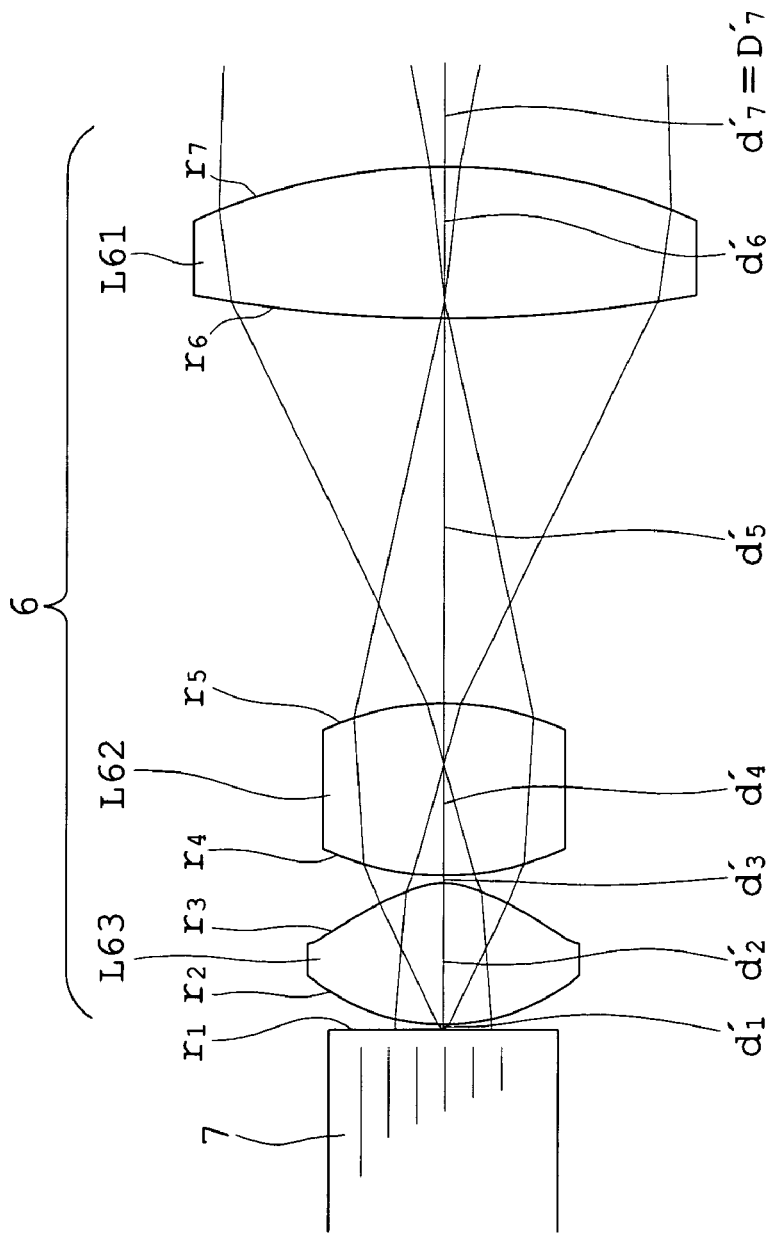
FIG. 14 is a partially sectional view showing a schematic arrangement, developed along the optical axis, of one modified example applicable to the illumination optical system in the stereomicroscope of Embodiment 1.

FIG. 14 shows a schematic arrangement of one modified example applicable to the illumination optical system in the stereomicroscope of Embodiment 1.

The illumination lens system 6 of this modified example has, in order from the object side, the biconvex lens L61, the biconvex lens L62, and the biconvex lens L63.

The biconvex lens L63 is constructed so that its object-side surface is aspherical.

The light guide 7 is connected to a light source, not shown. Also, in the illumination optical system applicable to the present invention, instead of the light guide 7 connected to the light source, not shown, an LED may be used.

Also, the illumination optical system shown in FIG. 14, as in FIG. 13, is depicted so that the observation object lies on the right side on the basis of the end face of the light guide 7 (or the luminescent surface of the LED).

Figure 15:
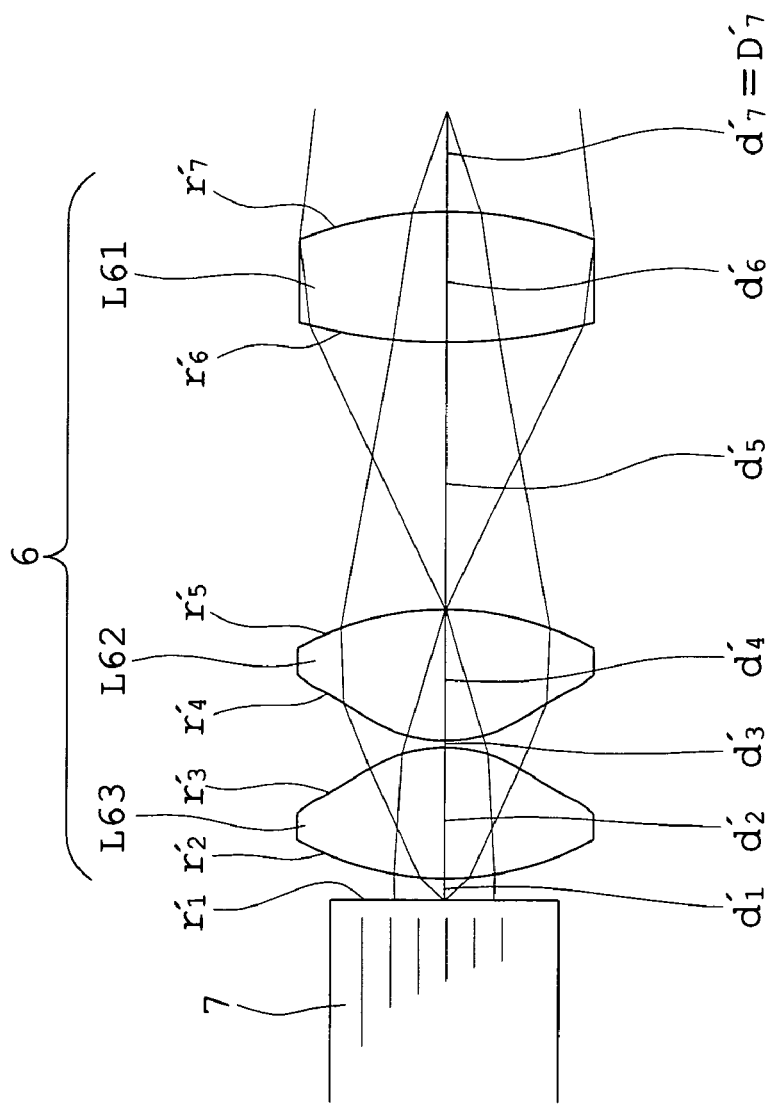
FIG. 15 is a partially sectional view showing a schematic arrangement, developed along the optical axis, of another modified example applicable to the illumination optical system in the stereomicroscope of Embodiment 1.

FIG. 15 shows a schematic arrangement of another modified example applicable to the illumination optical system in the stereomicroscope of Embodiment 1.

The illumination lens system 6 of this modified example has, in order from the object side, the biconvex lens L61, the biconvex lens L62, and the biconvex lens L63.

The biconvex lens L62 is constructed so that its light-guide-side surface is aspherical, and the biconvex lens L63 is constructed so that its object-side surface is aspherical.

The light guide 7 is connected to a light source, not shown. Also, in the illumination optical system applicable to the present invention, instead of the light guide 7 connected to the light source, not shown, an LED may be used.

Also, the illumination optical system shown in FIG. 15, as in FIG. 13, is depicted so that the observation object lies on the right side on the basis of the end face of the light guide 7 (or the luminescent surface of the LED).

Subsequently, numerical data of optical members constituting the observation optical system of the stereomicroscope of Embodiment 1 are shown below. In these numerical data, $S_1, S_2, \ldots$ denote surface numbers of optical members constituting the observation optical system of the stereomicroscope; $r_1, r_2, \ldots$ denote radii of curvature of optical members constituting the observation optical system of the stereomicroscope; $d_1, d_2, \ldots$ denote face-to-face spacings of optical members constituting the observation optical system of the stereomicroscope; $n_{d1}, n_{d2}, \ldots$ denote refractive indices of optical members constituting the observation optical system of the stereomicroscope at the d line; and $V_{d1}, V_{d2}, \ldots$ denote Abbe's numbers of optical members constituting the observation optical system of the stereomicroscope at the d line. These symbols are also used for the numerical data of other embodiments to be described later.

Also, z is taken as the direction of the optical axis of the optical system and y is taken as the direction of an image height.

The decentration is given by the amount of decentration (X, Y, and Z are taken as the directions of X, Y, and Z axes, respectively) of the vertex position of a surface from the center of the origin of the optical system and inclination angles ($\alpha, \beta,$ and $\gamma(°)$) of the center axis of the surface, with X, Y, and Z axes as centers. In this case, the positive of each of the angles $\alpha$ and $\gamma$ means a counterclockwise direction with respect to the positive direction of its corresponding axis and the positive of the angle $\gamma$ means a clockwise direction with respect to the positive direction of the Z axis. Also, the method of rotating the center axis of the surface at the angles $\alpha, \beta,$ and $\gamma$ is that the center axis of the surface and the XYZ rectangular coordinate system are rotated by the angle $\alpha$ in the counterclockwise direction around the X axis; the center axis of the rotated surface is rotated by the angle $\beta$ in the counterclockwise direction around the Y axis of a new coordinate system and the coordinate system rotated once is also rotated by the angle $\beta$ in the counterclockwise direction around the Y axis; and the center axis of the surface rotated twice is rotated by the angle $\gamma$ in the clockwise direction around the Z axis of the new coordinate system.

Numerical data 1 (Embodiment 1: observation optical system)

Working distance (WD): 100.00 mm
(Objective lens system)

| | | | | |
|---|---|---|---|---|
| $S_1$ | $r_1 = -36.3400$ | $d_1 = 2.3000$ | $n_{d1} = 1.72000$ | $v_{d1} = 43.69$ |
| $S_2$ | $r_2 = 26.9560$ | $d_2 = 3.2000$ | $n_{d2} = 1.84666$ | $v_{d2} = 23.78$ |
| $S_3$ | $r_3 = 107.3880$ | $d_3 = D3$ | | |
| $S_4$ | $r_4 = \infty$ | $d_4 = 2.4000$ | $n_{d4} = 1.76182$ | $v_{d4} = 26.52$ |
| $S_5$ | $r_5 = 52.7010$ | $d_5 = 3.4000$ | $n_{d5} = 1.49700$ | $v_{d5} = 81.54$ |
| $S_6$ | $r_6 = -73.8630$ | $d_6 = 0.2000$ | | |
| $S_7$ | $r_7 = 179.0640$ | $d_7 = 3.0000$ | $n_{d7} = 1.72916$ | $v_{d7} = 54.68$ |
| $S_8$ | $r_8 = -48.3680$ | $d_8 = D8$ | | |

(Afocal relay system)

| | | | | |
|---|---|---|---|---|
| $S_9$ | $r_9 = 41.8660$ | $d_9 = 4.6000$ | $n_{d9} = 1.72916$ | $v_{d9} = 54.68$ |
| $S_{10}$ | $r_{10} = -114.3140$ | $d_{10} = 0.4500$ | | |
| $S_{11}$ | $r_{11} = 11.7850$ | $d_{11} = 8.6000$ | $n_{d11} = 1.49700$ | $v_{d11} = 81.54$ |
| $S_{12}$ | $r_{12} = -44.9320$ | $d_{12} = 1.8500$ | $n_{d12} = 1.80100$ | $v_{d12} = 34.97$ |
| $S_{13}$ | $r_{13} = 8.9630$ | $d_{13} = 11.4500$ | | |
| $S_{14}$ | $r_{14} = 24.2420$ | $d_{14} = 2.9000$ | $n_{d14} = 1.72916$ | $v_{d14} = 54.68$ |
| $S_{15}$ | $r_{15} = -35.1640$ | $d_{15} = 10.6400$ | | |
| $S_{16}$ (intermediate imaging plane) | $r_{16} = \infty$ | $d_{16} = 4.2191$ | | |
| $S_{17}$ | $r_{17} = \infty$ | $d_{17} = 18.8000$ | $n_{d17} = 1.72916$ | $v_{d17} = 54.68$ |
| $S_{18}$ | $r_{18} = \infty$ | $d_{18} = 1.0000$ | | |
| $S_{19}$ | $r_{19} = \infty$ | $d_{19} = 2.6000$ | $n_{d19} = 1.72916$ | $v_{d19} = 54.68$ |
| $S_{20}$ | $r_{20} = -16.0550$ | $d_{20} = 5.9500$ | | |
| $S_{21}$ | $r_{21} = -8.9160$ | $d_{21} = 3.6500$ | $n_{d21} = 1.80100$ | $v_{d21} = 34.97$ |

-continued

Numerical data 1 (Embodiment 1: observation optical system)

| | | | | |
|---|---|---|---|---|
| $S_{22}$ | $r_{22} = 66.5060$ | $d_{22} = 9.7000$ | $n_{d22} = 1.49700$ | $v_{d22} = 81.54$ |
| $S_{23}$ | $r_{23} = -12.4580$ | $d_{23} = 1.6500$ | | |
| $S_{24}$ | $r_{24} = \infty$ | $d_{24} = 4.7500$ | $n_{d24} = 1.78590$ | $v_{d24} = 44.20$ |
| $S_{25}$ | $r_{25} = -51.9460$ | $d_{25} = 4.0000$ | | |

(Variable magnification optical system)

| | | | | |
|---|---|---|---|---|
| $S_{26}$ | $r_{26} = 26.2300$ | $d_{26} = 2.7000$ | $n_{d26} = 1.49700$ | $v_{d26} = 81.54$ |
| $S_{27}$ | $r_{27} = -26.2300$ | $d_{27} = 1.1000$ | $n_{d27} = 1.80100$ | $v_{d27} = 34.97$ |
| $S_{28}$ | $r_{28} = -53.7860$ | $d_{28} = D28$ | | |
| $S_{29}$ | $r_{29} = 97.0690$ | $d_{29} = 1.1000$ | $n_{d29} = 1.83400$ | $v_{d29} = 37.16$ |
| $S_{30}$ | $r_{30} = 43.1600$ | $d_{30} = 2.9473$ | | |
| $S_{31}$ | $r_{31} = -21.2750$ | $d_{31} = 1.1000$ | $n_{d31} = 1.51633$ | $v_{d31} = 64.14$ |
| $S_{32}$ | $r_{32} = 7.7210$ | $d_{32} = 2.0000$ | $n_{d32} = 1.84666$ | $v_{d32} = 23.78$ |
| $S_{33}$ | $r_{33} = 11.4890$ | $d_{33} = D33$ | | |
| $S_{34}$ | $r_{34} = -58.8060$ | $d_{34} = 1.1000$ | $n_{d34} = 1.48749$ | $v_{d34} = 70.23$ |
| $S_{35}$ | $r_{35} = 22.4160$ | $d_{35} = D35$ | | |
| $S_{36}$ | $r_{36} = 26.3710$ | $d_{36} = 1.1000$ | $n_{d36} = 1.83400$ | $v_{d36} = 37.16$ |
| $S_{37}$ | $r_{37} = 16.3960$ | $d_{37} = 2.7000$ | $n_{d37} = 1.49700$ | $v_{d37} = 81.54$ |
| $S_{38}$ | $r_{38} = -20.0580$ | $d_{38} = 2.0000$ | | |

(Aperture stop)

| | | | | |
|---|---|---|---|---|
| $S_{39}$ | $r_{39} = \infty$ | $d_{39} = 1.0000$ | | |

(Imaging optical system)

| | | | | |
|---|---|---|---|---|
| $S_{40}$ | $r_{40} = \infty$ | $d_{40} = 16.0000$ | $n_{d40} = 1.72916$ | $v_{d40} = 54.68$ |
| $S_{41}$ | $r_{41} = \infty$ | $d_{41} = 3.0000$ | | |
| $S_{42}$ | $r_{42} = 24.4260$ | $d_{42} = 2.5000$ | $n_{d42} = 1.48700$ | $v_{d42} = 81.54$ |
| $S_{43}$ | $r_{43} = -14.9320$ | $d_{43} = 1.2000$ | $n_{d43} = 1.80100$ | $v_{d43} = 34.97$ |
| $S_{44}$ | $r_{44} = -37.4160$ | $d_{44} = 6.3500$ | | |
| $S_{45}$ | $r_{45} = 20.9230$ | $d_{45} = 4.5000$ | $n_{d45} = 1.77250$ | $v_{d45} = 49.60$ |
| $S_{46}$ | $r_{46} = \infty$ | $d_{46} = 1.0000$ | | |
| $S_{47}$ | $r_{47} = \infty$ | $d_{47} = 1.6000$ | $n_{d47} = 1.51400$ | $v_{d47} = 74.00$ |
| $S_{48}$ | $r_{48} = \infty$ | $d_{48} = 3.5500$ | | |
| $S_{49}$ | $r_{49} = 9.2540$ | $d_{49} = 3.0000$ | $n_{d49} = 1.83400$ | $v_{d49} = 37.16$ |
| $S_{50}$ | $r_{50} = 3.8430$ | $d_{50} = 5.4766$ | | |
| $S_{51}$ | $r_{51} = \infty$ | $d_{51} = 1.7000$ | $n_{d51} = 1.51633$ | $v_{d51} = 64.14$ |
| $S_{52}$ | $r_{52} = \infty$ | $d_{52} = 0.4000$ | | |
| $S_{53}$ | $r_{53} = \infty$ | $d_{53} = 0.0300$ | | |
| $S_{54}$ | $r_{54} = \infty$ | $d_{54} = 0.8000$ | $n_{d54} = 1.51633$ | $v_{d54} = 64.14$ |
| $S_{55}$ (adhesive) | $r_{55} = \infty$ | $d_{55} = 0.0300$ | $n_{d55} = 1.51000$ | $v_{d55} = 64.10$ |
| $S_{56}$ | $r_{56} = \infty$ | $d_{56} = 1.0000$ | $n_{d56} = 1.61062$ | $v_{d56} = 50.50$ |
| $S_{57}$ (adhesive) | $r_{57} = \infty$ | $d_{57} = 0.0100$ | $n_{d57} = 1.52000$ | $v_{d57} = 64.10$ |
| $S_{58}$ | $r_{58} = \infty$ | $d_{58} = 0.0000$ | | |
| $S_{59}$ (adhesive) | | | | |

Amount of decentration behind $S_9$ relative to objective lens system

| | | |
|---|---|---|
| X = 0.00 | Y = 6.2500 | Z = 0.00 |
| α = 0.00 | β = 0.00 | γ = 0.00 |

Zoom data

| | Low (1) | Low (2) | Middle | High |
|---|---|---|---|---|
| Working distance (WD) | 100.00000 | 300.00000 | 100.00000 | 100.00000 |
| D3 | 9.73227 | 2.26574 | 9.73227 | 9.73227 |
| D8 | 1.53424 | 9.00077 | 1.53424 | 1.53424 |
| D28 | 3.00000 | 3.00000 | 13.55295 | 20.78994 |
| D33 | 14.90986 | 14.90986 | 4.32233 | 2.52301 |
| D35 | 8.40322 | 8.40322 | 8.43776 | 3.00000 |

Subsequently, numerical data of optical members constituting the illumination optical system of the stereomicroscope of Embodiment 1 are shown below. In these numerical data, $S'_1, S'_2, \ldots$ denote surface numbers of optical members constituting the illumination optical system of the stereomicroscope; $r'_1, r'_2, \ldots$ denote radii of curvature of optical members constituting the illumination optical system of the stereomicroscope; $d'_1, d'_2, \ldots$ denote face-to-face spacings of optical members constituting the illumination optical system of the stereomicroscope; $n'_{d1}, n'_{d2}, \ldots$ denote refractive indices of optical members constituting the illumination optical system of the stereomicroscope at the d line; and $v'_{d1}, v'_{d2}, \ldots$ denote Abbe's numbers of optical members constituting the illumination optical system of the stereomicroscope at the d line.

Also, z is taken as the direction of the optical axis of the optical system and y is taken as the direction of an image height. In the numerical data of the illumination optical system, the direction of the observation object on the basis of the end face of the light guide 7 (or the luminescent surface of the LED) is shown as the positive.

Also, when z is taken as the coordinate in the direction of the optical axis; h is taken as the coordinate in a direction normal to the optical axis; k represents a conic constant; A4, A6, A8, and A10 represent aspherical coefficients; and R represents the radius of curvature of a spherical component on the optical axis, the configuration of an aspherical surface is expressed by the following equation:

$$z = \frac{h^2}{R[1 + \{1 - (1+k)h^2/R^2\}^{1/2}]} + A_4 h^4 + A_6 h^6 + A_8 h^8 + A_{10} h^{10} + \ldots \quad (b)$$

| Numerical data 1 (Embodiment 1: illumination optical system) | | | | |
|---|---|---|---|---|
| (Light guide end face) | | | | |
| $S'_1$ | $r'_1 = \infty$ | $d'_1 = 0.1000$ | | |
| (Illumination lens system) | | | | |
| $S'_2$ | $r'_2 = 4.8630$ | $d'_2 = 2.1000$ | $n'_{d2} = 1.52300$ | $\nu'_{d2} = 60.00$ |
| $S'_3$ | $r'_3$ = (aspherical surface) | $d'_3 = 0.1000$ | | |
| $S'_4$ | $r'_4 = 4.8630$ | $d'_4 = 2.0000$ | $n'_{d4} = 1.52300$ | $\nu'_{d4} = 60.00$ |
| $S'_5$ | $r'_5$ = (aspherical surface) | $d'_5 = 0.2000$ | | |
| $S'_6$ (stop) | $r'_6 = \infty$ | $d'_6 = 0.5000$ | | |
| $S'_7$ | $r'_7 = 7.9020$ | $d'_7 = 1.8000$ | $n'_{d7} = 1.79952$ | $\nu'_{d7} = 42.22$ |
| $S'_8$ | $r'_8 = -7.9020$ | $d'_8 = 3.6000$ | | |
| $S'_9$ | $r'_9 = 10.0010$ | $d'_9 = 2.5000$ | $n'_{d9} = 1.79952$ | $\nu'_{d9} = 42.22$ |
| $S'_{10}$ | $r'_{10} = -10.0010$ | $d'_{10} = D'_{10}$ | | |
| $S'_{11}$ (object surface) | | | | |
| Aspherical coefficients | | | | | |
| $S'_3$ surface | | | | | |
| k = 0 | | | | | |
| $A_2 = -2.9948 \times 10^{-1}$ | $A_4 = 2.4385 \times 10^{-2}$ | $A_6 = -1.4201 \times 10^{-3}$ | $A_8 = 8.7648 \times 10^{-6}$ | | |
| $A_{10} = 5.9247 \times 10^{-5}$ | | | | | |
| $A_{12} = 4.3733 \times 10^{-6}$ | $A_{14} = -1.4913 \times 10^{-7}$ | $A_{16} = -3.5713 \times 10^{-7}$ | $A_{18} = 0$ | | $A_{20} = 0$ |
| $S'_5$ surface | | | | | |
| k = 0 | | | | | |
| $A_2 = -2.9948 \times 10^{-1}$ | $A_4 = 2.4385 \times 10^{-2}$ | $A_6 = -1.4201 \times 10^{-3}$ | $A_8 = 8.7648 \times 10^{-6}$ | | |
| $A_{10} = 5.9247 \times 10^{-5}$ | | | | | |
| $A_{12} = 4.3733 \times 10^{-6}$ | $A_{14} = -1.4913 \times 10^{-7}$ | $A_{16} = -3.5713 \times 10^{-7}$ | $A_{18} = 0$ | | $A_{20} = 0$ |
| Zoom data |
| $D'_{10}$ = 100-300 variable |
| NA (numerical aperture): 0.7000 |
| Front focal distance: 19.21304 |
| Back focal distance: 7.73381 |

| Numerical data 1' (Embodiment 1: illumination optical system, modified example 1) | | | | |
|---|---|---|---|---|
| (Light guide end face) | | | | |
| $S'_1$ | $r'_1 = \infty$ | $d'_1 = 0.1000$ | | |
| (Illumination lens system) | | | | |
| $S'_2$ | $r'_2 = 3.0000$ | $d'_2 = 2.1000$ | $n'_{d2} = 1.52300$ | $\nu'_{d2} = 60.00$ |
| $S'_3$ (aspherical surface) | $r'_3 = \infty$ | $d'_3 = 0.1000$ | | |
| $S'_4$ | $r'_4 = 4.0000$ | $d'_4 = 2.6000$ | $n'_{d4} = 1.88300$ | $\nu'_{d4} = 40.76$ |
| $S'_5$ | $r'_5 = -4.0000$ | $d'_5 = 5.8$ | | |
| $S'_6$ | $r'_6 = 20.0000$ | $d'_6 = 2.3000$ | $n'_{d6} = 1.79952$ | $\nu'_{d6} = 42.22$ |
| $S'_7$ | $r'_7 = -8.5000$ | $d'_7 = D'_7$ | | |
| $S'_8$ (object surface) | | | | |

-continued

Aspherical coefficients
S'₃ surface k = 0
$A_2 = -5.0000 \times 10^{-1}$  $A_4 = 1.8000 \times 10^{-1}$  $A_6 = -4.5000 \times 10^{-2}$  $A_8 = 3.5000 \times 10^{-3}$  $A_{10} = 0$
$A_{12} = 5.0000 \times 10^{-5}$  $A_{14} = 0$  $A_{16} = 0$  $A_{18} = 0$  $A_{20} = 0$ Zoom data D'7 = 100-300 variable
NA (numerical aperture): 0.66
Front focal distance: 4.75900
Back focal distance: −101.12285

Numerical data 1" (Embodiment 1: illumination optical system, modified example 2)

(Light guide end face)

| | | |
|---|---|---|
| S'₁ | r'₁ = ∞ | d'₁ = 0.32 |

(Illumination lens system)

| | | | | |
|---|---|---|---|---|
| S'₂ | r'₂ = 4.4000 | d'₂ = 2.0000 | n'$_{d2}$ = 1.52300 | v'$_{d2}$ = 60.00 |
| S'₃ (aspherical surface) | r'₃ = ∞ | d'₃ = 0.1000 | | |
| S'₄ (aspherical surface) | r'₄ = ∞ | d'₄ = 2.0000 | n'$_{d4}$ = 1.52300 | v'$_{d4}$ = 60.00 |
| S'₅ | r'₅ = −4.4000 | d'₅ = 4.0000 | | |
| S'₆ | r'₆ = 7.5000 | d'₆ = 2.0000 | n'$_{d6}$ = 1.79952 | v'$_{d6}$ = 42.22 |
| S'₇ | r'₇ = −6.2000 | d'₇ = D'₇ | | |
| S'₈ (object surface) | | | | |

Aspherical coefficients
S'₃ surface k = 0
$A_2 = -5.0000 \times 10^{-1}$  $A_4 = 1.8000 \times 10^{-1}$  $A_6 = -4.5000 \times 10^{-2}$  $A_8 = 3.5000 \times 10^{-3}$  $A_{10-0}$
$A_{12} = 5.0000 \times 10^{-5}$  $A_{14} = 0$  $A_{16} = 0$  $A_{18} = 0$  $A_{20} = 0$ Zoom data D'7 = 100-300 variable
NA (numerical aperture): 0.6600
Front focal distance: 21.22990
Back focal distance: 4.75900

Embodiment 2

Figure 16A:
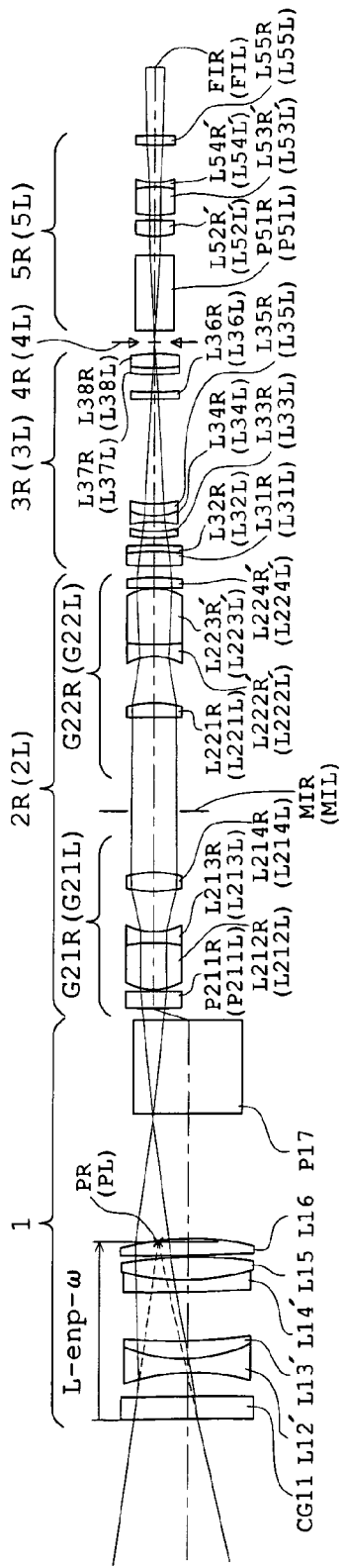
FIGS. 16A, 16B, and 16C are sectional views showing optical arrangements, developed along the optical axis, at low-magnification, middle-magnification, and high-magnification positions, respectively, where the working distance is 100 mm, in the observation optical system of the stereomicroscope according to Embodiment 2 of the present invention.
Figure 16B:
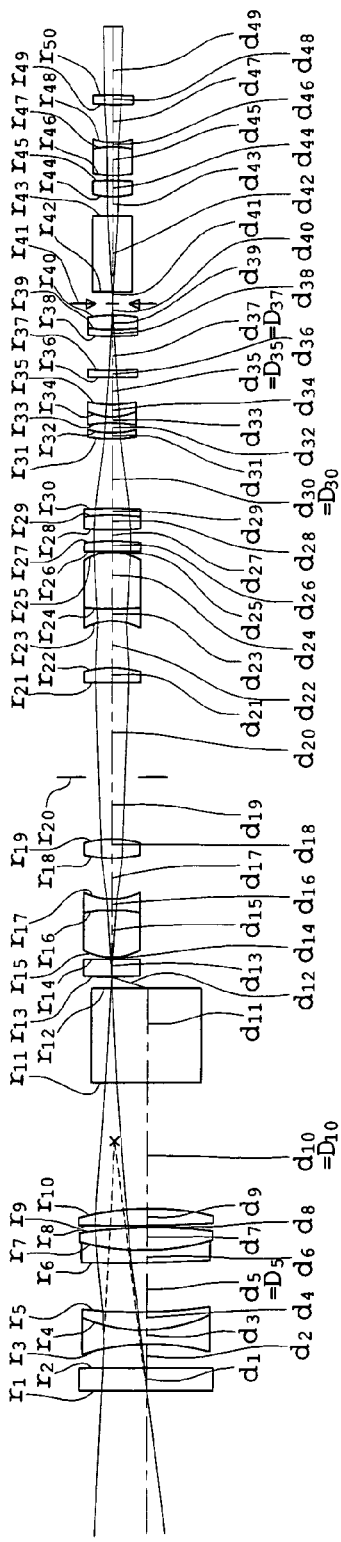
Figure 16C:
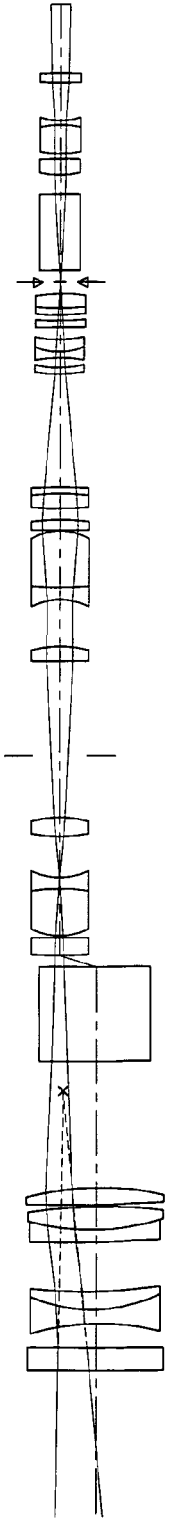

FIGS. 16A-16C show optical arrangements of the observation optical system of the stereomicroscope according to Embodiment 2 of the present invention. Also, in FIGS. 16A-16C, only one optical system is conveniently shown with respect to the stereomicroscope provided with optical systems for right and left eyes. In the illumination optical system of the stereomicroscope of Embodiment 2, as in Embodiment 1, the illumination optical system shown in any of FIGS. 13, 14, and 15 is applicable, and its explanation is eliminated.

The stereomicroscope of Embodiment 2 is constructed so that the observation optical system comprises, in order from the object side, the single objective lens system 1; the afocal relay optical system 2R (2L) which is one of a pair of right and left afocal relay optical systems; the variable magnification optical system 3R (3L) which is one of a pair of right and left variable magnification optical systems; the aperture stop 4R (4L) which is one of a pair of right and left optical aperture stops; and the imaging lens system 5R (5L) which is one of a pair of right and left imaging lens systems.

The objective lens system 1 includes, in order from the object side, a cover glass CG 11, a cemented doublet of a biconcave lens L12' and a positive meniscus lens L13' with a convex surface facing the object side, a cemented doublet of a negative meniscus lens L14' with a convex surface facing the object side and the biconvex lens L15, a biconvex lens L16, and a path bending prism P17.

The afocal relay optical system 2R (2L) is located at a position decentered 6.25 mm from the optical axis of the objective lens system 1.

The afocal relay optical system 2R (2L) includes the front lens unit G21R (G21L) with positive refracting power and the rear lens unit G22R (G22L) with positive refracting power and is constructed so that an intermediate image is formed between the front lens unit G21R (G21L) and the rear lens unit G22R (G22L). In FIGS. 16A-16C, reference symbol MIR (MIL) represents the position of the intermediate image on each of the right and left sides and PR (PL) represents the entrance pupil position of the observation optical system on each of the right and left sides.

The front lens unit G21R (G21L) has the biconvex lens L211R (L211L), the cemented doublet of the biconvex lens L212R (L212L) and the biconcave lens L213R (L213L), and the biconvex lens L214R (L214L).

The rear lens unit G22R (G22L) has a biconvex lens L221R (L221L), a cemented doublet of a biconcave lens L222R' (L222L') and a biconvex lens L223R' (L223L'), and a positive meniscus lens L224R' (L224L') with a concave surface facing the object side.

The variable magnification optical system 3R (3L) is located at a position corresponding to the afocal relay optical system 2R (2L).

The variable magnification optical system 3R (3L) includes the cemented doublet of the biconvex lens L31R (L31L) and the negative meniscus lens L32R (L32L) with the concave surface facing the object side, the negative meniscus lens L33R (L33L) with the convex surface facing the object side, the cemented doublet of the biconcave lens L34R (L34L) and the positive meniscus lens L35R (L35L) with a convex surface facing the object side, the biconcave lens L36R (L36L), and the cemented doublet of the negative meniscus lens L37R (L37L) with the convex surface facing the object side and the biconvex lens L38R (L38L).

The aperture stop 4R (4L) is provided at a position corresponding to the variable magnification optical system 3R (3L).

The imaging lens system 5R (5L) is provided at a position corresponding to the aperture stop 4R (4L).

The imaging lens system 5R (5L) includes the prism P51R (P51L), a positive meniscus lens L52R' (L52L') with a convex surface facing the object side, a cemented doublet of a biconvex lens L53R' (L53L') and a biconcave lens L54R' (L54L'), and a biconvex lens L55R (L55L).

When the magnification change is carried out in the range from the low-magnification position to the high-magnification position, the variable magnification optical system 3R (3L) is such that the cemented doublet of the biconvex lens L31R (L31L) and the negative meniscus lens L32R (L32L) with the concave surface facing the object side is fixed in position; the negative meniscus lens L33R (L33L) with the convex surface facing the object side and the cemented doublet of the biconcave lens L34R (L34L) and the positive meniscus lens L35R (L35L) with the convex surface facing the object side are moved toward the image side so as to narrow a spacing between this cemented doublet and the biconcave lens L36R (L36L); the biconcave lens L36R (L36L), after being moved toward the object side, is moved toward the image side; and the cemented doublet of the negative meniscus lens L37R (L37L) with the convex surface facing the object side and the biconvex lens L38R (L38L) is fixed in position.

When focusing is performed, the cemented doublet of the negative meniscus lens L14' with the convex surface facing the object side and the biconvex lens L15 and the biconvex lens L16 are moved along the optical axis.

Subsequently, numerical data of optical members constituting the observation optical system of the stereomicroscope of Embodiment 2 are shown below.

Numerical data 2 (Embodiment 2: observation optical system)

Working distance (WD): 100.00 mm
(Objective lens system)

| | | | | |
|---|---|---|---|---|
| $S_1$ | $r_1 = \infty$ | $d_1 = 4.0000$ | $n_{d1} = 1.51633$ | $v_{d1} = 64.14$ |
| $S_2$ | $r_2 = \infty$ | $d_2 = 4.0000$ | | |
| $S_3$ | $r_3 = -38.0920$ | $d_3 = 2.3000$ | $n_{d3} = 1.72000$ | $v_{d3} = 43.69$ |
| $S_4$ | $r_4 = 26.3445$ | $d_4 = 3.2000$ | $n_{d4} = 1.84666$ | $v_{d4} = 23.78$ |
| $S_5$ | $r_5 = 100.1065$ | $d_5 = D5$ | | |
| $S_6$ | $r_6 = 295.0209$ | $d_6 = 2.1000$ | $n_{d6} = 1.76182$ | $v_{d6} = 26.52$ |
| $S_7$ | $r_7 = 43.1621$ | $d_7 = 4.0000$ | $n_{d7} = 1.49700$ | $v_{d7} = 81.54$ |
| $S_8$ | $r_8 = -101.1051$ | $d_8 = 0.2000$ | | |
| $S_9$ | $r_9 = 157.0734$ | $d_9 = 3.2000$ | $n_{d9} = 1.72916$ | $v_{d9} = 54.68$ |
| $S_{10}$ | $r_{10} = -48.4815$ | $d_{10} = D10$ | | |
| $S_{11}$ | $r_{11} = \infty$ | $d_{11} = 16.5000$ | $n_{d11} = 1.73400$ | $v_{d11} = 51.47$ |
| $S_{12}$ | $r_{12} = \infty$ | $d_{12} = 2.0000$ | | |

(Afocal relay system)

| | | | | |
|---|---|---|---|---|
| $S_{13}$ | $r_{13} = 34.7200$ | $d_{13} = 3.2436$ | $n_{d13} = 1.72916$ | $v_{d13} = 54.68$ |
| $S_{14}$ | $r_{14} = -315.9951$ | $d_{14} = 0.3326$ | | |
| $S_{15}$ | $r_{15} = 10.9474$ | $d_{15} = 8.3321$ | $n_{d15} = 1.49700$ | $v_{d15} = 81.54$ |
| $S_{16}$ | $r_{16} = -33.8186$ | $d_{16} = 1.7170$ | $n_{d17} = 1.80100$ | $v_{d17} = 34.97$ |
| $S_{17}$ | $r_{17} = 8.4088$ | $d_{17} = 7.3554$ | | |
| $S_{18}$ | $r_{18} = 18.4987$ | $d_{18} = 3.4198$ | $n_{d18} = 1.72916$ | $v_{d18} = 54.68$ |
| $S_{19}$ | $r_{19} = -33.0125$ | $d_{19} = 11.0910$ | | |
| $S_{20}$ (intermediate imaging plane) | $r_{20} = \infty$ | $d_{20} = 16.5974$ | | |
| $S_{21}$ | $r_{21} = 175.6319$ | $d_{21} = 2.8469$ | $n_{d21} = 1.78590$ | $v_{d21} = 44.20$ |
| $S_{22}$ | $r_{22} = -23.5183$ | $d_{22} = 8.3217$ | | |
| $S_{23}$ | $r_{23} = -9.9245$ | $d_{23} = 2.0000$ | $n_{d23} = 1.80100$ | $v_{d23} = 34.97$ |
| $S_{24}$ | $r_{24} = 52.4641$ | $d_{24} = 9.9737$ | $n_{d24} = 1.49700$ | $v_{d24} = 81.54$ |
| $S_{25}$ | $r_{25} = -12.6653$ | $d_{25} = 0.1902$ | | |
| $S_{26}$ | $r_{26} = -1053.7881$ | $d_{26} = 1.7730$ | $n_{d26} = 1.72916$ | $v_{d26} = 54.68$ |
| $S_{27}$ | $r_{27} = -39.7299$ | $d_{27} = 2.0000$ | | |

(Variable magnification optical system)

| | | | | |
|---|---|---|---|---|
| $S_{28}$ | $r_{28} = 28.9599$ | $d_{28} = 2.7000$ | $n_{d28} = 1.49700$ | $v_{d28} = 81.54$ |
| $S_{29}$ | $r_{29} = -30.3428$ | $d_{29} = 1.1000$ | $n_{d29} = 1.80100$ | $v_{d29} = 34.97$ |
| $S_{30}$ | $r_{30} = -63.9931$ | $d_{30} = D30$ | | |
| $S_{31}$ | $r_{31} = 19.4620$ | $d_{31} = 1.1000$ | $n_{d31} = 1.83481$ | $v_{d31} = 42.71$ |
| $S_{32}$ | $r_{32} = 14.0625$ | $d_{32} = 1.7168$ | | |
| $S_{33}$ | $r_{33} = -19.1234$ | $d_{33} = 1.1000$ | $n_{d33} = 1.48749$ | $v_{d33} = 70.23$ |
| $S_{34}$ | $r_{34} = 10.7761$ | $d_{34} = 2.0000$ | $n_{d34} = 1.84666$ | $v_{d34} = 23.78$ |
| $S_{35}$ | $r_{35} = 16.6070$ | $d_{35} = D35$ | | |
| $S_{36}$ | $r_{36} = -252.8962$ | $d_{36} = 1.1000$ | $n_{d36} = 1.48749$ | $v_{d36} = 70.23$ |
| $S_{37}$ | $r_{37} = 47.4616$ | $d_{37} = D37$ | | |
| $S_{38}$ | $r_{38} = 28.7888$ | $d_{38} = 1.1000$ | $n_{d38} = 1.83400$ | $v_{d38} = 37.16$ |
| $S_{39}$ | $r_{39} = 18.6172$ | $d_{39} = 2.7000$ | $n_{d39} = 1.49700$ | $v_{d39} = 81.54$ |
| $S_{40}$ | $r_{40} = -26.7911$ | $d_{40} = 2.0000$ | | |

-continued

Numerical data 2 (Embodiment 2: observation optical system)

(Aperture stop)

| | | | | |
|---|---|---|---|---|
| $S_{41}$ | $r_{41} = \infty$ | $d_{41} = 2.0000$ | | |

(Imaging optical system)

| | | | | |
|---|---|---|---|---|
| $S_{42}$ | $r_{42} = \infty$ | $d_{42} = 13.2980$ | $n_{d42} = 1.60342$ | $\nu_{d42} = 38.03$ |
| $S_{43}$ | $r_{43} = \infty$ | $d_{43} = 3.3245$ | | |
| $S_{44}$ | $r_{44} = 14.5725$ | $d_{44} = 2.8289$ | $n_{d44} = 1.77250$ | $\nu_{d44} = 49.60$ |
| $S_{45}$ | $r_{45} = 79.2543$ | $d_{45} = 0.8596$ | | |
| $S_{46}$ | $r_{46} = 12.4611$ | $d_{46} = 5.0838$ | $n_{d46} = 1.49700$ | $\nu_{d46} = 81.54$ |
| $S_{47}$ | $r_{47} = -25.9862$ | $d_{47} = 0.7314$ | $n_{d47} = 1.80100$ | $\nu_{d47} = 34.97$ |
| $S_{48}$ | $r_{48} = 8.1553$ | $d_{48} = 6.6920$ | | |
| $S_{49}$ | $r_{49} = 24.2812$ | $d_{49} = 1.7093$ | $n_{d49} = 1.72916$ | $\nu_{d49} = 54.68$ |
| $S_{50}$ | $r_{50} = -41.5128$ | $d_{50} = 12.0597$ | | |
| $S_{51}$ (imaging plane) | | | | |

Amount of decentration behind $S_{13}$ relative to objective lens system

| | | |
|---|---|---|
| X = 0.00 | Y = 6.2500 | Z = 0.00 |
| α = 0.00 | β = 0.00 | γ = 0.00 |

Zoom data

| | Low (1) | Low (2) | Middle | High |
|---|---|---|---|---|
| Working distance (WD) | 100.00000 | 300.00000 | 100.00000 | 100.00000 |
| D5 | 8.59029 | 1.37948 | 8.59029 | 8.59029 |
| D10 | 21.95964 | 29.17045 | 21.95964 | 21.95964 |
| D30 | 1.27371 | 1.27371 | 12.02463 | 20.07260 |
| D35 | 18.93335 | 18.93335 | 5.14921 | 2.20313 |
| D37 | 3.06781 | 3.06781 | 6.10105 | 0.99855 |

Embodiment 3

Figure 17A:
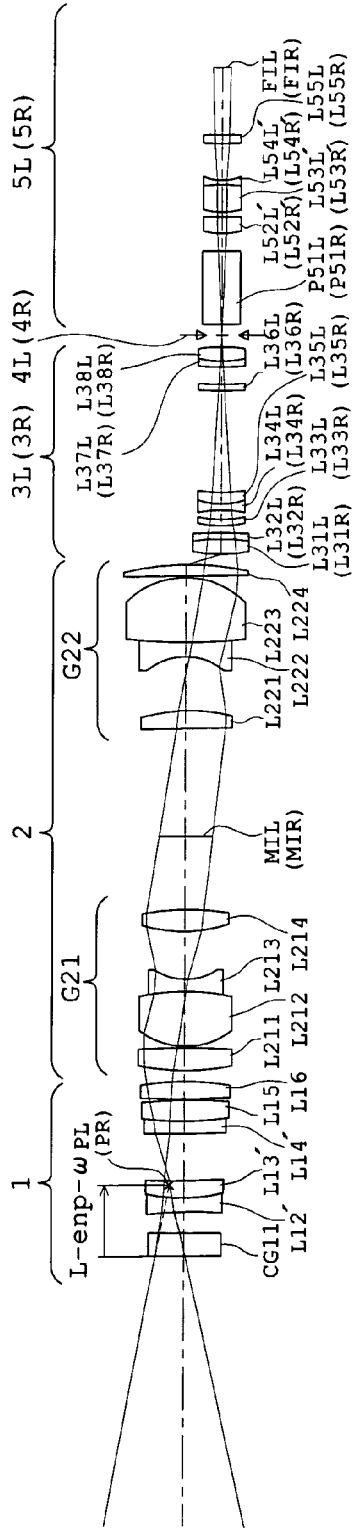
FIGS. 17A, 17B, and 17C are sectional views showing optical arrangements, developed along the optical axis, at low-magnification, middle-magnification, and high-magnification positions, respectively, where the working distance is 100 mm, in the observation optical system of the stereomicroscope according to Embodiment 3 of the present invention.
Figure 17B:
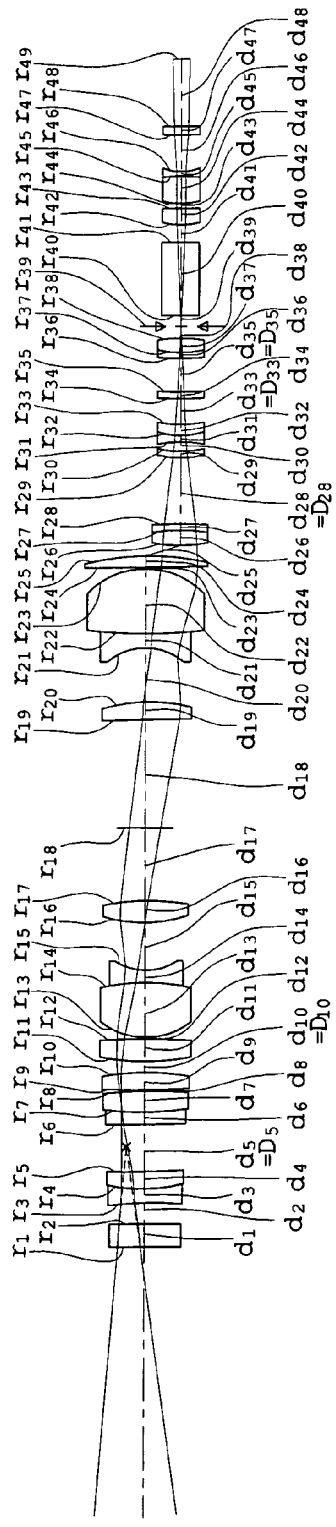
Figure 17C:
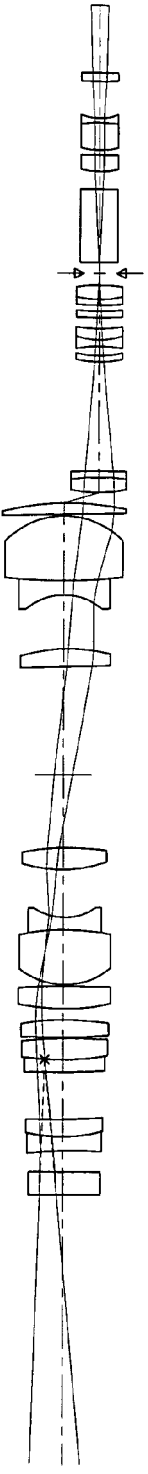

FIGS. 17A-17C show optical arrangements of the observation optical system of the stereomicroscope according to Embodiment 3 of the present invention. Also, in FIGS. 17A-17C, only one optical system is conveniently shown with respect to the stereomicroscope provided with optical systems for right and left eyes. In the illumination optical system of the stereomicroscope of Embodiment 3, as in Embodiment 1, the illumination optical system shown in any of FIGS. 13, 14, and 15 is applicable, and its explanation is eliminated.

The stereomicroscope of Embodiment 3 is constructed so that the observation optical system comprises, in order from the object side, the single objective lens system 1; a single afocal relay optical system 2; the variable magnification optical system 3L (3R) which is one of a pair of right and left variable magnification optical systems; the aperture stop 4L (4R) which is one of a pair of right and left aperture stops; and the imaging lens system 5L (5R) which is one of a pair of right and left imaging lens systems.

The objective lens system 1 includes, in order from the object side, the cover glass CG 11, the cemented doublet of the biconcave lens L12' and the positive meniscus lens L13' with the convex surface facing the object side, the cemented doublet of the negative meniscus lens L14' with the convex surface facing the object side and the biconvex lens L15, and the biconvex lens L16.

The afocal relay optical system 2 is located at a position corresponding to the objective lens system 1.

The afocal relay optical system 2 includes a front lens unit G21 with positive refracting power and a rear lens unit G22 with positive refracting power and is constructed so that an intermediate image is formed between the front lens unit G21 and the rear lens unit G22. In FIGS. 17A-17C, reference symbol MIL (MIR) represents the position of the intermediate image on each of the right and left sides and PL (PR) represents the entrance pupil position of the observation optical system on each of the right and left sides.

The front lens unit G21 has a biconvex lens L211, a cemented doublet of a biconvex lens L212 and a biconcave lens L213, and a biconvex lens L214.

The rear lens unit G22 has a biconvex lens L221, a cemented doublet of a biconcave lens L222 and a biconvex lens L223, and a positive meniscus lens L224 with a concave surface facing the object side.

The variable magnification optical system 3L (3R) is located at a position decentered −6.25 mm from the optical axis of the objective lens system 1.

The variable magnification optical system 3L (3R) includes the cemented doublet of the biconvex lens L31L (L31R) and the negative meniscus lens L32L (L32R) with the concave surface facing the object side, the negative meniscus lens L33L (L33R) with the convex surface facing the object side, the cemented doublet of the biconcave lens L34L (L34R) and the positive meniscus lens L35L (L35R) with a convex surface facing the object side, the biconcave lens L36L (L36R), and the cemented doublet of the negative meniscus lens L37L (L37R) with the convex surface facing the object side and the biconvex lens L38L (L38R).

The aperture stop 4L (4R) is provided at a position corresponding to the variable magnification optical system 3L (3R).

The imaging lens system 5L (5R) is provided at a position corresponding to the aperture stop 4L (4R).

The imaging lens system 5L (5R) includes the prism P51L (P51R), the positive meniscus lens L52L' (L52R') with the convex surface facing the object side, the cemented doublet of the biconvex lens L53L' (L53R') and the biconcave lens L54L' (L54R'), and the biconvex lens L55L (L55R).

When the magnification change is carried out in the range from the low-magnification position to the high-magnification position, the variable magnification optical system 3L (3R) is such that the cemented doublet of the biconvex lens L31L (L31R) and the negative meniscus lens L32L (L32R) with the concave surface facing the object side is fixed in position; the negative meniscus lens L33L (L33R) with the convex surface facing the object side and the cemented doublet of the biconcave lens L34L (L34R) and the positive meniscus lens L35L (L35R) with the convex surface facing the object side are moved toward the image side so as to narrow a spacing between this cemented doublet and the biconcave lens L36L (L36R); the biconcave lens L36L (L36R), after being moved toward the object side, is moved toward the image side; and the cemented doublet of the negative meniscus lens L37L (L37R) with the convex surface facing the object side and the biconvex lens L38L (L38R) is fixed in position.

When focusing is performed, the cemented doublet of the negative meniscus lens L14' with the convex surface facing the object side and the biconvex lens L15 and the biconvex lens L16 are moved along the optical axis.

Also, in the stereomicroscope of Embodiment 3, the function of making the working distance variable may be imparted to the afocal relay optical system 2 common to the right and left optical systems. It is good practice to design the optical system so that, for example, in focusing, the front lens unit G21 or the rear lens unit G22 in the afocal relay optical system 2 is moved along the optical axis. In doing so, a moving lens unit is eliminated from the top portion of the optical system, which is favorable for compactness of the top of the observation lens barrel.

Subsequently, numerical data of optical members constituting the observation optical system of the stereomicroscope of Embodiment 3 are shown below.

Numerical data 3 (Embodiment 3: observation optical system)

Working distance (WD): 100.00 mm
(Objective lens system)

| | | | | |
|---|---|---|---|---|
| $S_1$ | $r_1 = \infty$ | $d_1 = 4.0000$ | $n_{d1} = 1.51633$ | $v_{d1} = 64.14$ |
| $S_2$ | $r_2 = \infty$ | $d_2 = 4.0000$ | | |
| $S_3$ | $r_3 = -38.0920$ | $d_3 = 2.3000$ | $n_{d3} = 1.72000$ | $v_{d3} = 43.69$ |
| $S_4$ | $r_4 = 26.3445$ | $d_4 = 3.2000$ | $n_{d4} = 1.84666$ | $v_{d4} = 23.78$ |
| $S_5$ | $r_5 = 100.1065$ | $d_5 = D5$ | | |
| $S_6$ | $r_6 = 295.0209$ | $d_6 = 2.1000$ | $n_{d6} = 1.76182$ | $v_{d6} = 26.52$ |
| $S_7$ | $r_7 = 43.1621$ | $d_7 = 4.0000$ | $n_{d7} = 1.49700$ | $v_{d7} = 81.54$ |
| $S_8$ | $r_8 = -101.1051$ | $d_8 = 0.2000$ | | |
| $S_9$ | $r_9 = 157.0734$ | $d_9 = 3.2000$ | $n_{d9} = 1.72916$ | $v_{d9} = 54.68$ |
| $S_{10}$ | $r_{10} = -48.4815$ | $d_{10} = D10$ | | |

(Afocal relay system)

| | | | | |
|---|---|---|---|---|
| $S_{11}$ | $r_{11} = 42.8640$ | $d_{11} = 3.8924$ | $n_{d11} = 1.72916$ | $v_{d11} = 54.68$ |
| $S_{12}$ | $r_{12} = -379.1941$ | $d_{12} = 0.3991$ | | |
| $S_{13}$ | $r_{13} = 13.1369$ | $d_{13} = 9.9985$ | $n_{d13} = 1.49700$ | $v_{d13} = 81.54$ |
| $S_{14}$ | $r_{14} = -40.5824$ | $d_{14} = 2.0604$ | $n_{d14} = 1.80100$ | $v_{d14} = 34.97$ |
| $S_{15}$ | $r_{15} = 10.0906$ | $d_{15} = 8.8265$ | | |
| $S_{16}$ | $r_{16} = 23.3985$ | $d_{16} = 4.1038$ | $n_{d16} = 1.72916$ | $v_{d16} = 54.68$ |
| $S_{17}$ | $r_{17} = -39.6149$ | $d_{17} = 13.3092$ | | |
| $S_{18}$ (intermediate imaging plane) | $r_{18} = 19.9169$ | | | |
| $S_{19}$ | $r_{19} = 210.7583$ | $d_{19} = 3.4163$ | $n_{d19} = 1.78590$ | $v_{d19} = 44.20$ |
| $S_{20}$ | $r_{20} = -28.2220$ | $d_{20} = 9.9860$ | | |
| $S_{21}$ | $r_{21} = -11.9093$ | $d_{21} = 2.4000$ | $n_{d21} = 1.80100$ | $v_{d21} = 34.97$ |
| $S_{22}$ | $r_{22} = 62.9570$ | $d_{22} = 11.9684$ | $n_{d22} = 1.49700$ | $v_{d22} = 81.54$ |
| $S_{23}$ | $r_{23} = -15.1984$ | $d_{23} = 0.2283$ | | |
| $S_{24}$ | $r_{24} = -1264.5467$ | $d_{24} = 2.1276$ | $n_{d24} = 1.72916$ | $v_{d24} = 54.68$ |
| $S_{25}$ | $r_{25} = -47.6759$ | $d_{25} = 2.0000$ | | |

(Variable magnification optical system)

| | | | | |
|---|---|---|---|---|
| $S_{26}$ | $r_{26} = 28.9599$ | $d_{26} = 2.7000$ | $n_{d26} = 1.49700$ | $v_{d26} = 81.54$ |
| $S_{27}$ | $r_{27} = -30.3428$ | $d_{27} = 1.1000$ | $n_{d27} = 1.80100$ | $v_{d27} = 34.97$ |
| $S_{28}$ | $r_{28} = -63.9931$ | $d_{28} = D28$ | | |
| $S_{29}$ | $r_{29} = 19.4620$ | $d_{29} = 1.1000$ | $n_{d29} = 1.83481$ | $v_{d29} = 42.71$ |
| $S_{30}$ | $r_{30} = 14.0625$ | $d_{30} = 1.7168$ | | |
| $S_{31}$ | $r_{31} = -19.1234$ | $d_{31} = 1.1000$ | $n_{d31} = 1.48749$ | $v_{d31} = 70.23$ |
| $S_{32}$ | $r_{32} = 10.7761$ | $d_{32} = 2.0000$ | $n_{d32} = 1.84666$ | $v_{d32} = 23.78$ |
| $S_{33}$ | $r_{33} = 16.6070$ | $d_{33} = D33$ | | |
| $S_{34}$ | $r_{34} = -252.8962$ | $d_{34} = 1.1000$ | $n_{d34} = 1.48749$ | $v_{d34} = 70.23$ |
| $S_{35}$ | $r_{35} = 47.4616$ | $d_{35} = D35$ | | |
| $S_{36}$ | $r_{36} = 28.7888$ | $d_{36} = 1.1000$ | $n_{d36} = 1.83400$ | $v_{d36} = 37.16$ |
| $S_{37}$ | $r_{37} = 18.6172$ | $d_{37} = 2.7000$ | $n_{d37} = 1.49700$ | $v_{d37} = 81.54$ |
| $S_{38}$ | $r_{38} = -26.7911$ | $d_{38} = 2.0000$ | | |

(Aperture stop)

| | | | | |
|---|---|---|---|---|
| $S_{39}$ | $r_{39} = \infty$ | $d_{39} = 2.0000$ | | |

(Imaging optical system)

| | | | | |
|---|---|---|---|---|
| $S_{40}$ | $r_{40} = \infty$ | $d_{40} = 13.2980$ | $n_{d40} = 1.60342$ | $v_{d40} = 38.03$ |
| $S_{41}$ | $r_{41} = \infty$ | $d_{41} = 3.3245$ | | |
| $S_{42}$ | $r_{42} = 14.5725$ | $d_{42} = 2.8289$ | $n_{d42} = 1.77250$ | $v_{d42} = 49.60$ |
| $S_{43}$ | $r_{43} = 79.2543$ | $d_{43} = 0.8596$ | | |

-continued

Numerical data 3 (Embodiment 3: observation optical system)

| | | | | |
|---|---|---|---|---|
| $S_{44}$ | $r_{44} = 12.4611$ | $d_{44} = 5.0838$ | $n_{d44} = 1.49700$ | $v_{d44} = 81.54$ |
| $S_{45}$ | $r_{45} = -25.9862$ | $d_{45} = 0.7314$ | $n_{d45} = 1.80100$ | $v_{d45} = 34.97$ |
| $S_{46}$ | $r_{46} = 8.1553$ | $d_{46} = 6.6920$ | | |
| $S_{47}$ | $r_{47} = 24.2812$ | $d_{47} = 1.7093$ | $n_{d47} = 1.72916$ | $v_{d47} = 54.68$ |
| $S_{48}$ | $r_{48} = -41.5128$ | $d_{48} = 12.0597$ | | |
| $S_{49}$ (imaging plane) | | | | |

Amount of decentration behind $S_{26}$ relative to objective lens system

| | | |
|---|---|---|
| X = 0.00 | Y = -6.2500 | Z = 0.00 |
| α = 0.00 | β = 0.00 | γ = 0.00 |

Zoom data

| | Low (1) | Low (2) | Middle | High |
|---|---|---|---|---|
| Working distance (WD) | 100.00000 | 300.00000 | 100.00000 | 100.00000 |
| D5 | 8.59029 | 1.37948 | 8.59029 | 8.59029 |
| D10 | 1.95964 | 9.17045 | 1.95964 | 1.95964 |
| D28 | 1.27371 | 1.27371 | 12.02463 | 20.07260 |
| D33 | 18.93335 | 18.93335 | 5.14921 | 2.20313 |
| D35 | 3.06781 | 3.06781 | 6.10105 | 0.99855 |

Embodiment 4

FIGS. 18A-18C show optical arrangements of the observation optical system of the stereomicroscope according to Embodiment 4 of the present invention. Also, in FIGS. 18A-18C, only one optical system is conveniently shown with respect to the stereomicroscope provided with optical systems for right and left eyes. In the illumination optical system of the stereomicroscope of Embodiment 4, as in Embodiment 1, the illumination optical system shown in any of FIGS. 13, 14, and 15 is applicable, and its explanation is eliminated.

The stereomicroscope of Embodiment 4 is constructed so that the observation optical system comprises, in order from the object side, the single objective lens system 1; the single afocal relay optical system 2; a single variable magnification optical system 3; the aperture stop 4R (4L) which is one of a pair of right and left aperture stops; and the imaging lens system 5R (5L) which is one of a pair of right and left imaging lens systems.

The objective lens system 1 includes, in order from the object side, the cemented doublet of the biconcave lens L11 and the positive meniscus lens L12 with the convex surface facing the object side, the cemented doublet of the piano-concave lens L13 whose object-side surface is flat and whose image-side surface is concave and the biconvex lens L14, and the biconvex lens L15.

The afocal relay optical system 2 is located at a position corresponding to the objective lens system 1.

The afocal relay optical system 2 includes the front lens unit G21 with positive refracting power and the rear lens unit G22 with positive refracting power and is constructed so that an intermediate image is formed between the front lens unit G21 and the rear lens unit G22. In FIGS. 18A-18C, reference symbol MIL (MIR) represents the position of the intermediate image on each of the right and left sides and PL (PR) represents the entrance pupil position of the observation optical system on each of the right and left sides.

The front lens unit G21 has a biconvex lens L211, a cemented doublet of a biconvex lens L212 and a biconcave lens L213, and a biconvex lens L214.

The rear lens unit G22 has a path bending prism P221, a plano-convex lens L222 whose object-side surface is flat and whose image-side surface is convex, a cemented doublet of a biconcave lens L223 and a biconvex lens L224, and a plano-convex lens L225 whose object-side surface is flat and whose image-side surface is convex.

The variable magnification optical system 3 is provided at a position corresponding to the afocal relay optical system 2.

The variable magnification optical system 3 includes a biconvex lens L31, a cemented doublet of a biconvex lens L32 and a negative meniscus lens L33 with a concave surface facing the object side, a biconcave lens L34, a cemented doublet of a biconcave lens L35 and a positive meniscus lens L36 with a convex surface facing the object side, a negative meniscus lens L37 with a concave surface facing the object side, and a cemented doublet of a negative meniscus lens L38 with a convex surface facing the object side and a biconvex lens L39.

The aperture stop 4R (4L) is provided at a position decentered 3.5 mm from the optical axis of the objective lens system 1.

The imaging lens system 5R (5L) is located at a position corresponding to the aperture stop 4R (4L).

The imaging lens system 5R (5L) includes the prism P51R (P51L), the positive meniscus lens L52R' (L52L') with the convex surface facing the object side, the cemented doublet of the biconvex lens L53R' (L53L') and the biconcave lens L54R' (L54L'), and the biconvex lens L55R (L55L).

When the magnification change is carried out in the range from the low-magnification position to the high-magnification position, the variable magnification optical system 3 is such that the biconvex lens L31 and the cemented doublet of the biconvex lens L32 and the negative meniscus lens L33 with a concave surface facing the object side are fixed in position; the biconcave lens L34 and the cemented doublet of the biconcave lens L35 and the positive meniscus lens L36 with the convex surface facing the object side are moved toward the image side so as to narrow a spacing between this cemented doublet and the negative meniscus lens L37 with the concave surface facing the object side; the negative meniscus lens L37 with the concave surface facing the object side, after being moved toward the object side, is moved toward the image side; and the cemented doublet of the negative meniscus lens L38 with the convex surface facing the object side and the biconvex lens L39 is fixed in position.

When focusing is performed, the cemented doublet of the plano-concave lens L13 whose object-side surface is flat and whose image-side surface is concave and the biconvex lens L14 and the biconvex lens L15 are moved along the optical axis.

Also, in the stereomicroscope of Embodiment 4, the function of making the working distance variable may be imparted to the variable magnification optical system 3 common to the right and left optical systems. It is good practice to design the optical system so that, for example, in focusing, the biconvex lens L31 and the cemented doublet of the biconvex lens L32 and the negative meniscus lens L33 with the concave surface facing the object side, which are the most object-side lens unit in the variable magnification optical system 3, are moved along the optical axis. In doing so, a moving lens unit is eliminated from the top portion of the optical system, which is favorable for compactness of the top of the observation lens barrel.

Subsequently, numerical data of optical members constituting the observation optical system of the stereomicroscope of Embodiment 4 are shown below.

Numerical data 4 (Embodiment 4: observation optical system)

Working distance (WD): 100.00 mm
(Objective lens system)

| | | | | |
|---|---|---|---|---|
| $S_1$ | $r_1 = -36.3400$ | $d_1 = 2.3000$ | $n_{d1} = 1.72000$ | $v_{d1} = 43.69$ |
| $S_2$ | $r_2 = 26.9560$ | $d_2 = 3.2000$ | $n_{d2} = 1.84666$ | $v_{d2} = 23.78$ |
| $S_3$ | $r_3 = 107.3880$ | $d_3 = D3$ | | |
| $S_4$ | $r_4 = \infty$ | $d_4 = 2.4000$ | $n_{d4} = 1.76182$ | $v_{d4} = 26.52$ |
| $S_5$ | $r_5 = 52.7010$ | $d_5 = 3.4000$ | $n_{d5} = 1.49700$ | $v_{d5} = 81.54$ |
| $S_6$ | $r_6 = -73.8630$ | $d_6 = 0.2000$ | | |
| $S_7$ | $r_7 = 179.0640$ | $d_7 = 3.0000$ | $n_{d7} = 1.72916$ | $v_{d7} = 54.68$ |
| $S_8$ | $r_8 = -48.3680$ | $d_8 = D8$ | | |

(Afocal relay system)

| | | | | |
|---|---|---|---|---|
| $S_9$ | $r_9 = 52.5502$ | $d_9 = 5.7739$ | $n_{d9} = 1.72916$ | $v_{d9} = 54.68$ |
| $S_{10}$ | $r_{10} = -143.4869$ | $d_{10} = 0.5648$ | | |
| $S_{11}$ | $r_{11} = 14.7925$ | $d_{11} = 10.7947$ | $n_{d11} = 1.49700$ | $v_{d11} = 81.54$ |
| $S_{12}$ | $r_{12} = -56.3886$ | $d_{12} = 2.3221$ | $n_{d12} = 1.80100$ | $v_{d12} = 34.97$ |
| $S_{13}$ | $r_{13} = 11.2504$ | $d_{13} = 14.3720$ | | |
| $S_{14}$ | $r_{14} = 30.4286$ | $d_{14} = 3.6401$ | $n_{d14} = 1.72916$ | $v_{d14} = 54.68$ |
| $S_{15}$ | $r_{15} = -44.1379$ | $d_{15} = 13.3553$ | | |
| $S_{16}$ (intermediate imaging plane) | $r_{16} = \infty$ | $d_{16} = 5.0629$ | | |
| $S_{17}$ | $r_{17} = \infty$ | $d_{17} = 22.5600$ | $n_{d17} = 1.72916$ | $v_{d17} = 54.68$ |
| $S_{18}$ | $r_{18} = \infty$ | $d_{18} = 1.2000$ | | |
| $S_{19}$ | $r_{19} = \infty$ | $d_{19} = 3.1200$ | $n_{d19} = 1.72916$ | $v_{d19} = 54.68$ |
| $S_{20}$ | $r_{20} = -19.2660$ | $d_{20} = 7.1400$ | | |
| $S_{21}$ | $r_{21} = -10.6992$ | $d_{21} = 4.3800$ | $n_{d21} = 1.80100$ | $v_{d21} = 34.97$ |
| $S_{22}$ | $r_{22} = 79.8072$ | $d_{22} = 11.6400$ | $n_{d22} = 1.49700$ | $v_{d22} = 81.54$ |
| $S_{23}$ | $r_{23} = -14.9496$ | $d_{23} = 1.9800$ | | |
| $S_{24}$ | $r_{24} = \infty$ | $d_{24} = 5.7000$ | $n_{d24} = 1.78590$ | $v_{d24} = 44.20$ |
| $S_{25}$ | $r_{25} = -62.3352$ | $d_{25} = 4.0000$ | | |

(Variable magnification optical system)

| | | | | |
|---|---|---|---|---|
| $S_{26}$ | $r_{26} = 43.5051$ | $d_{26} = 3.5000$ | $n_{d26} = 1.49700$ | $v_{d26} = 81.54$ |
| $S_{27}$ | $r_{27} = -67.7688$ | $d_{27} = 0.2000$ | | |
| $S_{28}$ | $r_{28} = 145.8529$ | $d_{28} = 3.5000$ | $n_{d28} = 1.49700$ | $v_{d28} = 81.54$ |
| $S_{29}$ | $r_{29} = -32.9717$ | $d_{29} = 2.0000$ | $n_{d29} = 1.80100$ | $v_{d29} = 34.97$ |
| $S_{30}$ | $r_{30} = -103.9760$ | $d_{30} = D30$ | | |
| $S_{31}$ | $r_{31} = -1566.4401$ | $d_{31} = 1.3000$ | $n_{d31} = 1.83481$ | $v_{d31} = 42.71$ |
| $S_{32}$ | $r_{32} = 55.3447$ | $d_{32} = 0.9892$ | | |
| $S_{33}$ | $r_{33} = -18.5273$ | $d_{33} = 1.3000$ | $n_{d33} = 1.83481$ | $v_{d33} = 42.71$ |
| $S_{34}$ | $r_{34} = 9.3600$ | $d_{34} = 2.2000$ | $n_{d34} = 1.84666$ | $v_{d34} = 23.78$ |
| $S_{35}$ | $r_{35} = 14.1910$ | $d_{35} = D35$ | | |
| $S_{36}$ | $r_{36} = -30.2741$ | $d_{36} = 1.3000$ | $n_{d36} = 1.48749$ | $v_{d36} = 70.23$ |
| $S_{37}$ | $r_{37} = -200.7729$ | $d_{37} = D37$ | | |
| $S_{38}$ | $r_{38} = 22.6345$ | $d_{38} = 1.3000$ | $n_{d38} = 1.83400$ | $v_{d38} = 37.16$ |
| $S_{39}$ | $r_{39} = 13.4803$ | $d_{39} = 3.5000$ | $n_{d39} = 1.48749$ | $v_{d39} = 70.23$ |
| $S_{40}$ | $r_{40} = -24.4012$ | $d_{40} = 2.0000$ | | |

(Aperture stop)

| | | | | |
|---|---|---|---|---|
| $S_{41}$ | $r_{41} = \infty$ | $d_{41} = D41$ | | |

(Imaging optical system)

| | | | | |
|---|---|---|---|---|
| $S_{42}$ | $r_{42} = \infty$ | $d_{42} = 13.2980$ | $n_{d42} = 1.60342$ | $v_{d42} = 38.03$ |
| $S_{43}$ | $r_{43} = \infty$ | $d_{43} = 6.8847$ | | |
| $S_{44}$ | $r_{44} = 16.7285$ | $d_{44} = 1.7284$ | $n_{d44} = 1.78590$ | $v_{d44} = 44.20$ |
| $S_{45}$ | $r_{45} = 123.4540$ | $d_{45} = 0.2890$ | | |
| $S_{46}$ | $r_{46} = 7.1429$ | $d_{46} = 4.0351$ | $n_{d46} = 1.49700$ | $v_{d46} = 81.54$ |
| $S_{47}$ | $r_{47} = -319.2381$ | $d_{47} = 1.2527$ | $n_{d47} = 1.80100$ | $v_{d47} = 34.97$ |

-continued

Numerical data 4 (Embodiment 4: observation optical system)

| | | | | |
|---|---|---|---|---|
| $S_{48}$ | $r_{48} = 5.4502$ | $d_{48} = 3.8422$ | | |
| $S_{49}$ | $r_{49} = 11.2243$ | $d_{49} = 2.0035$ | $n_{d49} = 1.48749$ | $v_{d49} = 70.23$ |
| $S_{50}$ | $r_{50} = -22.6384$ | $d_{50} = 8.6220$ | | |
| $S_{51}$ (imaging plane) | | | | |

Amount of decentration behind $S_{41}$ relative to objective lens system

| | | |
|---|---|---|
| X = 0.00 | Y = 3.5000 | Z = 0.00 |
| α = 0.00 | β = 0.00 | γ = 0.00 |

Zoom data

| | Low (1) | Low (2) | Middle | High |
|---|---|---|---|---|
| Working distance (WD) | 100.00000 | 300.00000 | 100.00000 | 100.00000 |
| D3 | 9.73227 | 2.26574 | 9.73227 | 9.73227 |
| D8 | 1.53424 | 9.00077 | 1.53424 | 1.53424 |
| D30 | 0.99971 | 0.99971 | 10.79702 | 18.11784 |
| D35 | 18.24904 | 18.24904 | 5.74665 | 2.82534 |
| D37 | 2.69475 | 2.69475 | 5.40005 | 0.99953 |

Subsequently, values corresponding to condition parameters in individual embodiments are listed in Table 1.

TABLE 1

| Condition parameters | Embodiment 1 | Embodiment 2 | Embodiment 3 | Embodiment 4 |
|---|---|---|---|---|
| L__enp__w | 11.590 | 30.754 | 10.701 | 7.613 |
| f__ob | 159.474 | 164.217 | 164.217 | 159.474 |
| f__rf | 32.308 | 27.730 | 33.276 | 40.553 |
| f__rr | 38.007 | 38.000 | 45.600 | 45.608 |
| Δz | 13.96 | 25.75 | 6.50 | 10.11 |
| L__enp__w/f__ob | 0.073 | 0.187 | 0.065 | 0.048 |
| f__rf/f__rr | 0.850 | 0.730 | 0.730 | 0.889 |
| f__rf/f__ob | 0.203 | 0.169 | 0.203 | 0.254 |
| Δz/f__ob | 0.088 | 0.157 | 0.040 | 0.063 |
| Position of the most object-side surface of illumination lens system (Reference: Fist surface of observation optical system) (Symbol: Image side of reference surface is taken as positive) | −2.370 | 5.000 | 4.200 | −2.500 |

Also, in the stereomicroscope of each embodiment, the objective lens system 1 is constructed so that each lens is configured into a shape that its lower portion is straight cut by a preset amount, but it may be constructed so that the lens is not cut. In this case, although the light distribution and illumination efficiency cannot be optimized because of the relationship with the illumination optical system, the effect that the lateral dimension of the observation lens barrel is reduced can be brought about.

For the prism for changing a field direction in the stereomicroscope of each embodiment, an optical member other than that shown in FIG. 8 or 9 may be used. For example, the directions of the entrance and exit surfaces of the prism shown in FIG. 8 or 9 may be reversed with respect to the object and image sides. The prism may differ in shape from that of FIG. 8 or 9.

Figure 19:
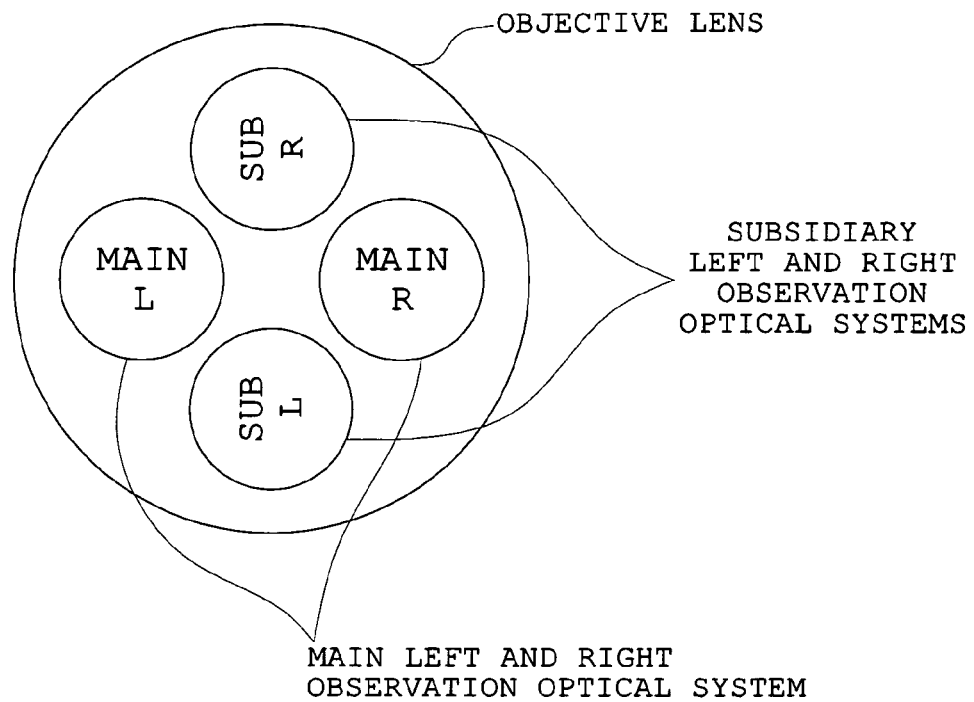
FIG. 19 is a conceptual view showing one application example of the stereomicroscope of the present invention for explaining an arrangement of a pair of right and left observation optical systems and another pair of right and left observation optical system perpendicular thereto.

In the stereomicroscope of each embodiment, in order that a chief viewer (a chief operator) and a sub-viewer (an assistant) carry out stereoscopic observations at the same time, as illustrated in FIG. 19, it is good practice, for example, to arrange a pair of right and left observation optical systems and another pair of right and left observation optical systems perpendicular thereto. In doing so, besides the observation direction of the chief viewer, the stereoscopic observation can be made along a direction perpendicular to the observation direction of the chief viewer.

Figure 20:
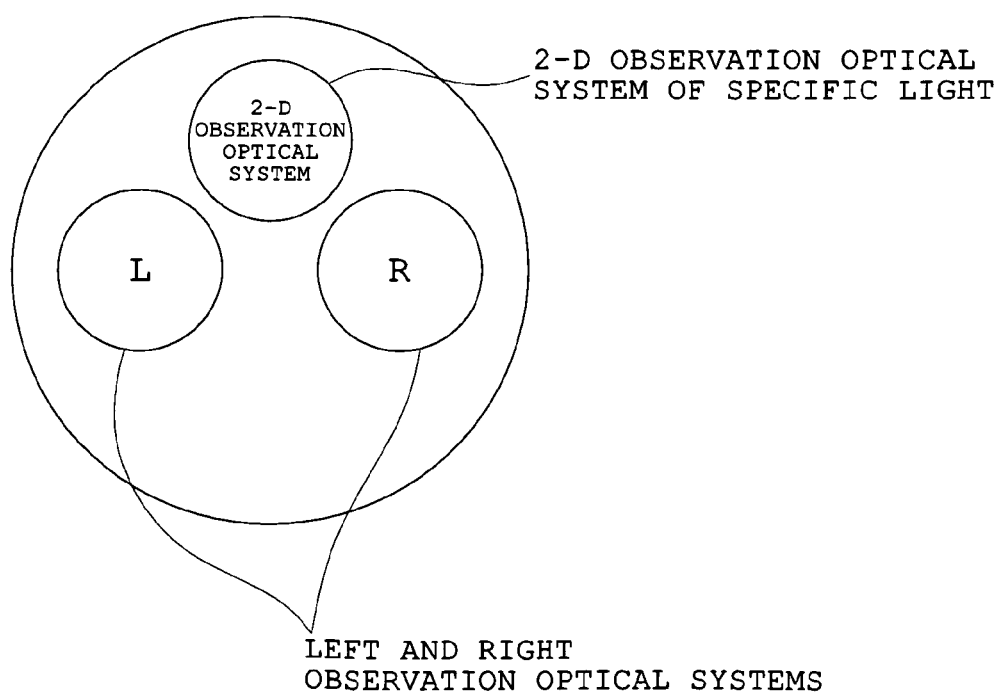
FIG. 20 is a conceptual view showing another application example of the stereomicroscope of the present invention for explaining an arrangement of a pair of right and left observation optical systems and an observation optical system for two-dimensionally observing particular light, such as infrared light, provided at the upper or lower position thereof.

Optical systems to be added, besides optical systems for stereoscopic observation of the sub-viewer, may be provided, for example, as illustrated in FIG. 20, as observation optical systems for carrying out the two-dimensional observation of specific light, such as infrared light, at the upper or lower position of the pair of right and left observation optical systems.

As mentioned above, the stereomicroscope of the present invention has additional features listed below.

(1) The stereomicroscope comprises, in order from the object side, a single objective lens system; a pair of right and left afocal relay optical systems, each including a front lens unit with positive refracting power and a rear lens unit with positive refracting power and having an intermediate image between the front lens unit and the rear lens unit; afocal zoom optical systems; a pair of right and left aperture stops; a pair of right and left imaging lens systems; and electronic image sensors located at the imaging positions of the pair of right and left imaging lens systems. In this case, when each of the afocal zoom optical systems lies at the low-magnification position, an entrance pupil of an optical system ranging from the objective lens system to each of the imaging optical systems is located closest to the objective lens system to satisfy Conditions (1)-(3).

(2) The stereomicroscope comprises, in order from the object side, a single objective lens system; a pair of right and left afocal relay optical systems, each including a front lens unit with positive refracting power and a rear lens unit with positive refracting power and having an intermediate image between the front lens unit and the rear lens unit; afocal zoom optical systems; a pair of right and left aperture stops; a pair of right and left imaging lens systems; and electronic image sensors located at the imaging positions of the pair of right and left imaging lens systems. In this case, when each of the afocal zoom optical systems lies at the low-magnification position, an entrance pupil of an optical system ranging from the objective lens system to each of the imaging optical systems is located closest to the objective lens system to satisfy Conditions (1)-(3), and an illumination optical system is located in the proximity of the entrance pupil of the optical system ranging from the objective lens system to the imaging optical system to satisfy Condition (4).

(3) The stereomicroscope comprises, in order from the object side, a single objective lens system; a single afocal relay optical system including a front lens unit with positive refracting power and a rear lens unit with positive refracting power and having an intermediate image between the front lens unit and the rear lens unit; variable magnification optical systems; a plurality of aperture stops, each located at a position decentered from the optical axis of the objective lens system; and a plurality of imaging lens systems located at positions corresponding to the plurality of aperture stops. In this case, when each of the variable magnification optical systems lies at the low-magnification position, an entrance pupil of an optical system ranging from the objective lens system to each of the imaging optical systems is located closest to the objective lens system, and in order to change the working distance, the front lens unit or the rear lens unit of the afocal relay optical system is moved along the optical axis to satisfy Conditions (1)-(3).

(4) The stereomicroscope comprises, in order from the object side, a single objective lens system; a single afocal relay optical system including a front lens unit with positive refracting power and a rear lens unit with positive refracting power and having an intermediate image between the front lens unit and the rear lens unit; a single afocal zoom optical system; a plurality of aperture stops, each located at a position decentered from the optical axis of the objective lens system; and a plurality of imaging lens systems located at positions corresponding to the plurality of aperture stops. In this case, when the afocal zoom optical system lies at the low-magnification position, an entrance pupil of an optical system ranging from the objective lens system to each of the imaging optical systems is located closest to the objective lens system, and in order to change the working distance, the most object-side lens unit of the afocal zoom optical system is moved along the optical axis to satisfy Conditions (1)-(3).

The stereomicroscope of the present invention is useful for a field in which when the stereomicroscope is used to carry out observation, it is desired to ensure the widest possible working space, notably the field of medicine of a surgical microscope.

What is claimed is:

1. A stereomicroscope comprising, in order from an object side:
    a single objective lens system;
    afocal relay optical systems, each including a front lens unit with positive refracting power and a rear lens unit with positive refracting power and having an intermediate image between the front lens unit and the rear lens unit;
    variable magnification optical systems;
    a plurality of aperture stops including at least aperture stops for right and left eyes, located at positions decentered from an optical axis of the objective lens system; and
    a plurality of imaging lens systems located at positions corresponding to the plurality of aperture stops,
    wherein when each of the variable magnification optical systems lies at the low-magnification position, an entrance pupil of an optical system ranging from the objective lens system to each of the imaging lens systems is located closest to the objective lens system to satisfy the following condition:

$$0 < L\_enp\_w / f\_ob < 0.3$$

where $L\_enp\_w$ is a distance from a most object-side surface of the objective lens system where a working distance is shortest to the entrance pupil at a low-magnification position, in which a symbol where the entrance pupil is located on an image side of the most object-side surface of the objective lens system is taken as a positive, and $f\_ob$ is a focal length of the objective lens system where the working distance is shortest.

2. A stereomicroscope according to claim 1, further satisfying the following condition:

$$0.5 < f\_rf / f\_rr < 0.9$$

where $f\_rf$ is a focal length of the front lens unit of each of the afocal relay optical systems and $f\_rr$ is a focal length of the rear lens unit of each of the afocal relay optical systems.

3. A stereomicroscope according to claim 2, further satisfying the following condition:

$$0.1 < f\_rf / f\_ob < 0.4.$$

4. A stereomicroscope according to claim 1, further comprising an illumination optical system placed in the proximity of the entrance pupil of the optical system ranging from the objective lens system to each of the imaging lens systems to satisfy the following condition:

$$-0.1 < \Delta z / f\_ob < 0.3$$

where $\Delta z$ is a distance from the most object-side surface of the illumination optical system where the working distance is shortest to the entrance pupil at the low-magnification position, in which a symbol where the entrance pupil is located on the image side of the most object-side surface of the illumination optical system is taken as a positive.

5. A stereomicroscope comprising, in order from an object side:
    a single objective lens system;
    afocal relay optical systems, each including a front lens unit with positive refracting power and a rear lens unit with positive refracting power and having an intermediate image between the front lens unit and the rear lens unit;
    variable magnification optical systems;

a plurality of aperture stops including at least aperture stops for right and left eyes, located at positions decentered from an optical axis of the objective lens system; and a plurality of imaging lens systems located at positions corresponding to the plurality of aperture stops, wherein an illumination optical system is located in the proximity of an entrance pupil of an optical system ranging from the objective lens system to each of the imaging lens systems and when each of the variable magnification optical systems lies at a low-magnification position, the entrance pupil of the optical system ranging from the objective lens system to each of the imaging lens systems is located closest to the objective lens system to satisfy the following conditions:

$0 < L\_enp\_w/f\_ob < 0.3$ $0.5 < f\_rf/f\_rr < 0.9$ $0.1 < f\_rf/f\_ob < 0.4$ $-0.1 < \Delta z/f\_ob < 0.3$ where $L\_enp\_w$ is a distance from a most object-side surface of the objective lens system where a working distance is shortest to the entrance pupil at a low-magnification position, in which a symbol where the entrance pupil is located on an image side of the most object-side surface of the objective lens system is taken as a positive; $f\_ob$ is a focal length of the objective lens system where the working distance is shortest; $f\_rf$ is a focal length of the front lens unit of each of the afocal relay optical systems; $f\_rr$ is a focal length of the rear lens unit of each of the afocal relay optical systems; and $\Delta z$ is a distance from the most object-side surface of the illumination optical system where the working distance is shortest to the entrance pupil at the low-magnification position, in which a symbol where the entrance pupil is located on the image side of the most object-side surface of the illumination optical system is taken as a positive.

* * * * *